US011100883B2

(12) United States Patent
Yamamoto et al.

(10) Patent No.: US 11,100,883 B2
(45) Date of Patent: Aug. 24, 2021

(54) SOURCE DRIVER

(71) Applicant: Rohm Co., Ltd., Kyoto (JP)

(72) Inventors: Takateru Yamamoto, Kyoto (JP);
Yasutaka Kusao, Kyoto (JP); Sheryll Anne Dayao Joson, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 479 days.

(21) Appl. No.: 16/061,736

(22) PCT Filed: Apr. 20, 2018

(86) PCT No.: PCT/JP2018/016257
§ 371 (c)(1),
(2) Date: Jun. 13, 2018

(87) PCT Pub. No.: WO2018/198955
PCT Pub. Date: Nov. 1, 2018

(65) Prior Publication Data
US 2020/0349900 A1     Nov. 5, 2020

(30) Foreign Application Priority Data
Apr. 27, 2017   (JP) .............................. JP2017-087971

(51) Int. Cl.
*G09G 3/36*     (2006.01)
(52) U.S. Cl.
CPC ... *G09G 3/3688* (2013.01); *G09G 2310/0264* (2013.01); *G09G 2310/08* (2013.01); *G09G 2330/06* (2013.01)

(58) Field of Classification Search
CPC ......... G09G 3/3688; G09G 2310/0264; G09G 2310/08; G09G 2330/06
See application file for complete search history.

(56) References Cited

U.S. PATENT DOCUMENTS

| 6,661,402 B1* | 12/2003 | Nitta | G09G 3/2011 345/100 |
| 2005/0264518 A1* | 12/2005 | Nojiri | G09G 3/3688 345/103 |
| 2007/0152946 A1* | 7/2007 | Endou | G09G 3/3688 345/100 |
| 2007/0152947 A1* | 7/2007 | Tanaka | G09G 5/001 345/100 |
| 2009/0046044 A1* | 2/2009 | Chen | G09G 3/3688 345/87 |

(Continued)

FOREIGN PATENT DOCUMENTS

JP     2009-300866     12/2009

*Primary Examiner* — Amare Mengistu
*Assistant Examiner* — Jennifer L Zubajlo
(74) *Attorney, Agent, or Firm* — Fish & Richardson P.C.

(57) ABSTRACT

A source driver 130 includes a first latch 131 outputting a first data signal D1(1) having multiple bits (e.g., eight bits), a second latch 132 outputting a second data signal D2(1) by latching the first data signal D1(1) in a plurality of steps in units of one or more bits, a DAC 133 converting the second data signal D2(1) into an analog signal A(1), and an amplifier 134 receiving the analog signal A(1) to output a source signal S(1). The second latch 132 latches the first data signal D1(1), e.g., one bit at every clock, one bit at every plurality of clocks, a plurality of bits at every clock, or a plurality of bits at every plurality of clocks.

16 Claims, 30 Drawing Sheets

(56) References Cited

U.S. PATENT DOCUMENTS

| | | | |
|---|---|---|---|
| 2009/0309869 A1* | 12/2009 | Umeda | G09G 3/3648 345/214 |
| 2011/0141098 A1* | 6/2011 | Yaguma | G09G 3/3688 345/212 |
| 2012/0229483 A1* | 9/2012 | Li | G09G 3/3611 345/531 |
| 2013/0285998 A1* | 10/2013 | Hong | G09G 3/36 345/212 |
| 2015/0109354 A1* | 4/2015 | Kim | G09G 3/2003 345/691 |
| 2015/0221274 A1* | 8/2015 | Ishii | G09G 3/3685 345/690 |
| 2019/0189061 A1* | 6/2019 | Ryu | G09G 3/3426 |

* cited by examiner

FIG. 6

| | MSB<br>(Bit7) | | | | | | | LSB<br>(Bit0) | Hex | Dec |
|---|---|---|---|---|---|---|---|---|---|---|
| Start | 0 | 0 | 0 | 0 | 0 | 0 | 0 | 0 | 00h | 0 |
| 1 | 1 | 0 | 0 | 0 | 0 | 0 | 0 | 0 | 80h | 128 |
| 2 | 1 | 1 | 0 | 0 | 0 | 0 | 0 | 0 | C0h | 192 |
| 3 | 1 | 1 | 1 | 0 | 0 | 0 | 0 | 0 | E0h | 224 |
| 4 | 1 | 1 | 1 | 1 | 0 | 0 | 0 | 0 | F0h | 240 |
| 5 | 1 | 1 | 1 | 1 | 1 | 0 | 0 | 0 | F8h | 248 |
| 6 | 1 | 1 | 1 | 1 | 1 | 1 | 0 | 0 | FCh | 252 |
| 7 | 1 | 1 | 1 | 1 | 1 | 1 | 1 | 0 | FEh | 254 |
| 8 | 1 | 1 | 1 | 1 | 1 | 1 | 1 | 1 | FFh | 255 |

FIG. 8

|  | MSB (Bit7) |  |  |  |  |  |  | LSB (Bit0) | Hex | Dec |
|---|---|---|---|---|---|---|---|---|---|---|
| Start | 0 | 0 | 0 | 0 | 0 | 0 | 0 | 0 | 00h | 0 |
| 1 | 0 | 0 | 0 | 0 | 0 | 0 | 0 | 1 | 01h | 1 |
| 2 | 0 | 0 | 0 | 0 | 0 | 0 | 1 | 1 | 03h | 3 |
| 3 | 0 | 0 | 0 | 0 | 0 | 1 | 1 | 1 | 07h | 7 |
| 4 | 0 | 0 | 0 | 0 | 1 | 1 | 1 | 1 | 0Fh | 15 |
| 5 | 0 | 0 | 0 | 1 | 1 | 1 | 1 | 1 | 1Fh | 31 |
| 6 | 0 | 0 | 1 | 1 | 1 | 1 | 1 | 1 | 3Fh | 63 |
| 7 | 0 | 1 | 1 | 1 | 1 | 1 | 1 | 1 | 7Fh | 127 |
| 8 | 1 | 1 | 1 | 1 | 1 | 1 | 1 | 1 | FFh | 255 |

FIG. 10

| | MSB<br>(Bit7) | | | | | | | LSB<br>(Bit0) | Hex | Dec |
|---|---|---|---|---|---|---|---|---|---|---|
| Start | 1 | 1 | 1 | 1 | 1 | 1 | 1 | 1 | FFh | 255 |
| 1 | 1 | 1 | 1 | 1 | 1 | 1 | 1 | 0 | FEh | 254 |
| 2 | 1 | 1 | 1 | 1 | 1 | 1 | 0 | 0 | FCh | 252 |
| 3 | 1 | 1 | 1 | 1 | 1 | 0 | 0 | 0 | F8h | 248 |
| 4 | 1 | 1 | 1 | 1 | 0 | 0 | 0 | 0 | F0h | 240 |
| 5 | 1 | 1 | 1 | 0 | 0 | 0 | 0 | 0 | E0h | 224 |
| 6 | 1 | 1 | 0 | 0 | 0 | 0 | 0 | 0 | C0h | 192 |
| 7 | 1 | 0 | 0 | 0 | 0 | 0 | 0 | 0 | 80h | 128 |
| 8 | 0 | 0 | 0 | 0 | 0 | 0 | 0 | 0 | 00h | 0 |

FIG. 12

|  | MSB<br>(Bit7) |  |  |  |  |  |  | LSB<br>(Bit0) | Hex | Dec |
|---|---|---|---|---|---|---|---|---|---|---|
| Start | 1 | 1 | 1 | 1 | 1 | 1 | 1 | 1 | FFh | 255 |
| 1 | 0 | 1 | 1 | 1 | 1 | 1 | 1 | 1 | 7Fh | 127 |
| 2 | 0 | 0 | 1 | 1 | 1 | 1 | 1 | 1 | 3Fh | 63 |
| 3 | 0 | 0 | 0 | 1 | 1 | 1 | 1 | 1 | 1Fh | 31 |
| 4 | 0 | 0 | 0 | 0 | 1 | 1 | 1 | 1 | 0Fh | 15 |
| 5 | 0 | 0 | 0 | 0 | 0 | 1 | 1 | 1 | 07h | 7 |
| 6 | 0 | 0 | 0 | 0 | 0 | 0 | 1 | 1 | 03h | 3 |
| 7 | 0 | 0 | 0 | 0 | 0 | 0 | 0 | 1 | 01h | 1 |
| 8 | 0 | 0 | 0 | 0 | 0 | 0 | 0 | 0 | 00h | 0 |

FIG. 14

| | MSB (Bit7) | | | | | | | LSB (Bit0) | Hex | Dec |
|---|---|---|---|---|---|---|---|---|---|---|
| Start | 0 | 0 | 0 | 0 | 0 | 0 | 0 | 0 | 00h | 0 |
| 1 | 1 | 0 | 0 | 0 | 0 | 0 | 0 | 0 | 80h | 128 |
| 2 | 1 | 0 | 0 | 0 | 0 | 0 | 0 | 0 | | |
| 3 | 1 | 1 | 0 | 0 | 0 | 0 | 0 | 0 | C0h | 192 |
| 4 | 1 | 1 | 0 | 0 | 0 | 0 | 0 | 0 | | |
| 5 | 1 | 1 | 1 | 0 | 0 | 0 | 0 | 0 | E0h | 224 |
| 6 | 1 | 1 | 1 | 0 | 0 | 0 | 0 | 0 | | |
| 7 | 1 | 1 | 1 | 1 | 0 | 0 | 0 | 0 | F0h | 240 |
| 8 | 1 | 1 | 1 | 1 | 0 | 0 | 0 | 0 | | |
| 9 | 1 | 1 | 1 | 1 | 1 | 0 | 0 | 0 | F8h | 248 |
| 10 | 1 | 1 | 1 | 1 | 1 | 0 | 0 | 0 | | |
| 11 | 1 | 1 | 1 | 1 | 1 | 1 | 0 | 0 | FCh | 252 |
| 12 | 1 | 1 | 1 | 1 | 1 | 1 | 0 | 0 | | |
| 13 | 1 | 1 | 1 | 1 | 1 | 1 | 1 | 0 | FEh | 254 |
| 14 | 1 | 1 | 1 | 1 | 1 | 1 | 1 | 0 | | |
| 15 | 1 | 1 | 1 | 1 | 1 | 1 | 1 | 1 | FFh | 255 |
| 16 | 1 | 1 | 1 | 1 | 1 | 1 | 1 | 1 | | |

FIG. 16

| | MSB<br>(Bit7) | | | | | | | LSB<br>(Bit0) | Hex | Dec |
|---|---|---|---|---|---|---|---|---|---|---|
| Start | 0 | 0 | 0 | 0 | 0 | 0 | 0 | 0 | 00h | 0 |
| 1 | 0 | 0 | 0 | 0 | 0 | 0 | 0 | 1 | 01h | 1 |
| 2 | 0 | 0 | 0 | 0 | 0 | 0 | 0 | 1 | | |
| 3 | 0 | 0 | 0 | 0 | 0 | 0 | 1 | 1 | 03h | 3 |
| 4 | 0 | 0 | 0 | 0 | 0 | 0 | 1 | 1 | | |
| 5 | 0 | 0 | 0 | 0 | 0 | 1 | 1 | 1 | 07h | 7 |
| 6 | 0 | 0 | 0 | 0 | 0 | 1 | 1 | 1 | | |
| 7 | 0 | 0 | 0 | 0 | 1 | 1 | 1 | 1 | 0Fh | 15 |
| 8 | 0 | 0 | 0 | 0 | 1 | 1 | 1 | 1 | | |
| 9 | 0 | 0 | 0 | 1 | 1 | 1 | 1 | 1 | 1Fh | 31 |
| 10 | 0 | 0 | 0 | 1 | 1 | 1 | 1 | 1 | | |
| 11 | 0 | 0 | 1 | 1 | 1 | 1 | 1 | 1 | 3Fh | 63 |
| 12 | 0 | 0 | 1 | 1 | 1 | 1 | 1 | 1 | | |
| 13 | 0 | 1 | 1 | 1 | 1 | 1 | 1 | 1 | 7Fh | 127 |
| 14 | 0 | 1 | 1 | 1 | 1 | 1 | 1 | 1 | | |
| 15 | 1 | 1 | 1 | 1 | 1 | 1 | 1 | 1 | FFh | 255 |
| 16 | 1 | 1 | 1 | 1 | 1 | 1 | 1 | 1 | | |

FIG. 18

|  | MSB<br>(Bit7) | | | | | | | LSB<br>(Bit0) | Hex | Dec |
|---|---|---|---|---|---|---|---|---|---|---|
| Start | 0 | 0 | 0 | 0 | 0 | 0 | 0 | 0 | 00h | 0 |
| 1 | 1 | 1 | 0 | 0 | 0 | 0 | 0 | 0 | C0h | 192 |
| 2 | 1 | 1 | 1 | 1 | 0 | 0 | 0 | 0 | F0h | 240 |
| 3 | 1 | 1 | 1 | 1 | 1 | 1 | 0 | 0 | FCh | 252 |
| 4 | 1 | 1 | 1 | 1 | 1 | 1 | 1 | 1 | FFh | 255 |

FIG. 20

|  | MSB (Bit7) |  |  |  |  |  |  | LSB (Bit0) | Hex | Dec |
|---|---|---|---|---|---|---|---|---|---|---|
| Start | 0 | 0 | 0 | 0 | 0 | 0 | 0 | 0 | 00h | 0 |
| 1 | 0 | 0 | 0 | 0 | 0 | 0 | 1 | 1 | 03h | 3 |
| 2 | 0 | 0 | 0 | 0 | 1 | 1 | 1 | 1 | 0Fh | 15 |
| 3 | 0 | 0 | 1 | 1 | 1 | 1 | 1 | 1 | 3Fh | 63 |
| 4 | 1 | 1 | 1 | 1 | 1 | 1 | 1 | 1 | FFh | 255 |

FIG. 22

|       | MSB<br>(Bit7) | | | | | | | LSB<br>(Bit0) | Hex | Dec |
|-------|---|---|---|---|---|---|---|---|-----|-----|
| Start | 0 | 0 | 0 | 0 | 0 | 0 | 0 | 0 | 00h | 0   |
| 1     | 1 | 0 | 0 | 0 | 0 | 0 | 0 | 1 | 81h | 129 |
| 2     | 1 | 1 | 0 | 0 | 0 | 0 | 1 | 1 | C3h | 195 |
| 3     | 1 | 1 | 1 | 0 | 0 | 1 | 1 | 1 | E7h | 231 |
| 4     | 1 | 1 | 1 | 1 | 1 | 1 | 1 | 1 | FFh | 255 |

FIG. 24

|       | MSB (Bit7) |   |   |   |   |   |   | LSB (Bit0) | Hex | Dec |
|-------|---|---|---|---|---|---|---|---|------|-----|
| Start | 0 | 0 | 0 | 0 | 0 | 0 | 0 | 0 | 00h  | 0   |
| 1     | 1 | 0 | 0 | 0 | 0 | 0 | 0 | 0 | 80h  | 128 |
| 2     | 1 | 1 | 0 | 0 | 0 | 0 | 0 | 0 | C0h  | 192 |
| 3     | 1 | 1 | 1 | 1 | 1 | 0 | 0 | 0 | F8h  | 248 |
| 4     | 1 | 1 | 1 | 1 | 1 | 1 | 1 | 1 | FFh  | 255 |

SOURCE DRIVER

TECHNICAL FIELD

The invention disclosed herein relates to a source driver.

BACKGROUND ART

As electronic devices become increasingly sophisticated, fast-operating, and densely integrated, the electromagnetic waves (what is called EMI (electromagnetic interference)) are an issue these days.

One example of prior art related to what has just been mentioned is seen in Patent Document 1 identified below.

LIST OF CITATIONS

Patent Literature

Patent Document 1: Japanese Patent Application published as No. 2009-300866.

SUMMARY OF THE INVENTION

Technical Problem

For example, in a driver IC that drives a liquid crystal panel, EMI is considered to have a peak when source output values for a plurality of columns change simultaneously. What is of special note is that liquid crystal panels are given ever higher resolutions, and as the number of source output channels from driver ICs increase, EMI has come to exhibit prominent peaks.

Against this background, let alone LSIs used in consumer equipment, LSIs used in vehicle-mounted and industrial equipment in particular are subject to strict international standards related to EMI, and any of them that do not comply with those standards are prohibited from use in equipment.

In view of the above-mentioned challenge encountered by the present inventors, the invention disclosed herein is aimed at providing a panel driving device that can cope with display panels with ever higher resolutions while suppressing a peak of EMI, and providing a source driver for use in such a panel driving device.

Means for Solving the Problem

According to one aspect of what is disclosed herein, a source driver includes: a first latch that outputs a first data signal comprising multiple bits; a second latch that outputs a second data signal by latching the first data signal in a plurality of steps in units of one or more bits; a DAC (digital-to-analog converter) that converts the second data signal into an analog signal; and an amplifier that receives the analog signal to output a source signal (a first configuration).

In the source driver of the first configuration described above, preferably, during at least part of the latch operation period, the second latch latches the first data signal one bit at every clock of the first data signal (a second configuration).

In the source driver of the first or second configuration described above, preferably, during at least part of the latch operation period, the second latch latches the first data signal one bit at every plurality of clocks of the first data signal (a third configuration).

In the source driver of any one of the first to third configurations described above, preferably, during at least part of the latch operation period, the second latch latches the first data signal a plurality of bits at every clock of the first data signal (a fourth configuration).

In the source driver of any one of the first to fourth configurations described above, preferably, during at least part of the latch operation period, the second latch latches the first data signal a plurality of bits at every plurality of clocks of the first data signal (a fifth configuration).

In the source driver of any one of the first to fifth configurations described above, preferably, the second latch latches the first data signal sequentially from the highest bit to the lowest bit or from the lowest bit to the highest bit (a sixth configuration).

In the source driver of the fourth or fifth configuration described above, preferably, the second latch latches, of all the bits of the first data signal, a highest and a lowest of unlatched bits simultaneously (a seventh configuration).

In the source driver of the fourth or fifth configuration described above, preferably, the second latch latches, of all the bits of the first data signal, lower bits in a larger number simultaneously (an eighth configuration).

In the source driver of any one of the first to eighth configurations described above, preferably, the second latch performs latch operation with different settings between adjacent columns (a ninth configuration).

In the source driver of any one of the first to ninth configurations described above, preferably, the second latch switches settings for latch operation every predetermined period (a tenth configuration).

In the source driver of any one of the first to tenth configurations described above, preferably, a plurality of the second latch for a plurality of columns start latch operation simultaneously for the plurality of columns (an eleventh configuration).

In the source driver of any one of the first to tenth configurations described above, preferably, a plurality of the second latch for a plurality of columns are divided into a plurality of groups, and start latch operation with timing shifted among the groups (a twelfth configuration).

In the source driver of the twelfth configuration described above, preferably, the latch operation periods of the respective groups partly overlap with each other between temporally successive groups (a thirteenth configuration).

According to another aspect of what is disclosed herein, a panel driving device includes: an interface that receives image data and control commands; a timing controller that performs timing control for individual blocks in the device; a source driver according to any one of the first to thirteenth configurations described above that outputs a source signal; a gate driver that outputs a gate signal; and a command register that stores the control commands (a fourteenth configuration).

According to yet another aspect of what is disclosed herein, a display device includes: a panel driving device of the fourteenth configuration described above; a display panel that is driven by the panel driving device; and a host controller that delivers image data and control commands to the panel driving device (a fifteenth configuration).

According to a further aspect of what is disclosed herein, a vehicle includes a display device of the fifteenth configuration described above (a sixteenth configuration).

Advantageous Effects of the Invention

According to the invention disclosed herein, it is possible to provide a panel driving device that can cope with display panels with ever higher resolutions while suppressing a peak of EMI, and to provide a source driver for use in such a panel driving device.

BRIEF DESCRIPTION OF DRAWINGS

FIG. 6 is a diagram showing gradation values of a second data signal in a first practical example (one bit every clock (MSB to LSB), 00h to FFh);

FIG. 8 is a diagram showing gradation values of a second data signal in a second practical example (one bit every clock (LSB to MSB), 00h to FFh);

FIG. 10 is a diagram showing gradation values of a second data signal in a third practical example (one bit every clock (LSB to MSB), FFh to 00h);

FIG. 12 is a diagram showing gradation values of a second data signal in a fourth practical example (one bit every clock (MSB to LSB), FFh to 00h);

FIG. 14 is a diagram showing gradation values of a second data signal in a fifth practical example (one bit every two clocks (MSB to LSB), 00h to FFh);

FIG. 16 is a diagram showing gradation values of a second data signal in a sixth practical example (one bit every two clocks (LSB to MSB), 00h to FFh);

FIG. 18 is a diagram showing gradation values of a second data signal in a seventh practical example (one bit every two clocks (MSB to LSB), 00h to FFh);

FIG. 20 is a diagram showing gradation values of a second data signal in an eighth example (one bit every two clocks (MSB to LSB), 00h to FFh);

FIG. 22 is a diagram showing gradation values of a second data signal in a ninth practical example (one bit every two clocks (0 & 7, then 1 & 6, then 2 & 5, then 3 & 4), 00h to FFh);

FIG. 24 is a diagram showing gradation values of a second data signal in a ninth practical example (one bit every clock or three bits every clock (7, then 6, then 3, 4, & 5, then 0, 1, & 2), 00h to FFh);

DESCRIPTION OF EMBODIMENTS

<Display Device>

Figure 1:
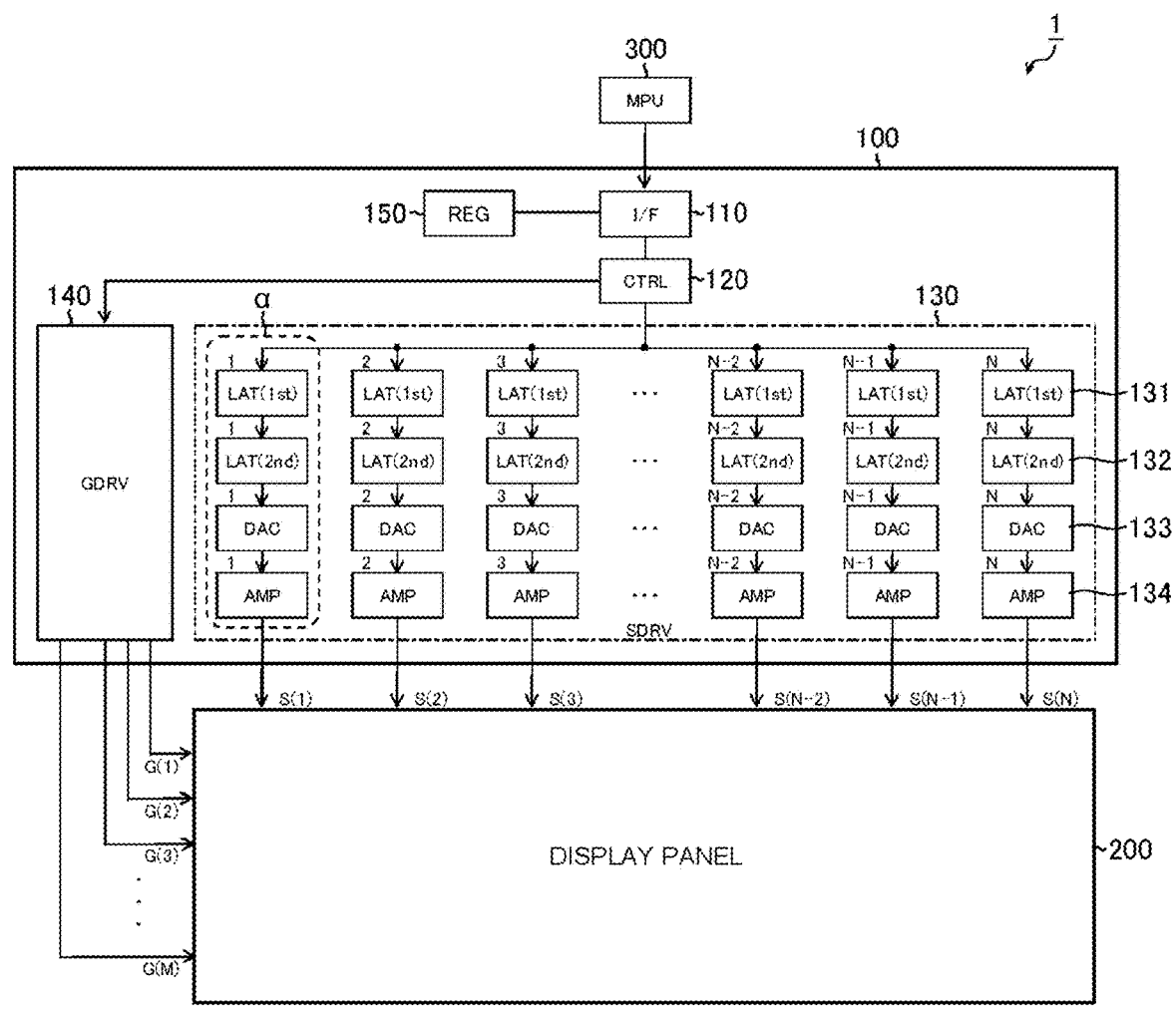
FIG. 1 is a block diagram showing an overall configuration of a display device.

FIG. 1 is a block diagram showing an overall configuration of a display device. The display device 1 of this configuration example includes a panel driving device 100, a display panel 200, and a host controller 300.

The panel driving device 100 drives and controls the display panel 200 based on image data (gradation data) and control commands fed in from the host controller 300.

The display panel 200 is a video output means that employs liquid crystal elements, organic EL (electro-luminescence) elements, or the like as pixels, and is driven by the panel driving device 100.

The host controller 300 is the chief agent that controls the operation of the display device 1 in a centralized fashion, as by delivering image data and control commands to the panel driving device 100. As the host controller 300, an MPU (microprocessing unit) or the like can be used suitably.

<Panel Driving Device>

With reference still to FIG. 1, the panel driving device 100 will be described in detail. The panel driving device 100 is a semiconductor circuit device (what is generally called a driver IC) that has integrated in it an interface 110, a timing controller 120, a source driver 130, a gate driver 140, a command register 150, and the like.

The interface 110 is a front end that conducts serial communication with the host controller 300, and receives image data and control commands.

The timing controller 120 performs, based on the control commands stored in the command register 150, various kinds of data processing (such as shuffling of image data) and various kinds of timing control (horizontal synchronization control for the source driver 130, vertical synchronization control for the gate driver 140, and the like).

Based on image data, a horizontal synchronizing signal, and a clock signal that are fed from the timing controller 120, the source driver 130 outputs source signals S(1) to S(N) for N columns (where N≥2). In a case where the display panel 200 is a liquid crystal display panel of an active matrix type, the source signals S(1) to S(N) are fed respectively to the source terminals of active devices (for example, TFTs (thin-film transistors)) that are connected to liquid crystal elements in respective columns.

Based on a vertical synchronizing signal fed from the timing controller 120, the gate driver 140 outputs gate signals G(1) to G(M) for M rows (where M≥2). In a case where the display panel 200 is a liquid crystal display panel of an active matrix type, the gate signals G(1) to G(M) are fed respectively to the gate terminals of active devices (for example, TFTs) that are connected to liquid crystal elements in the respective rows.

The command register 150 stores control commands fed in from the host controller 300 via the interface 110.

The panel driving device 100 has integrated in it, in addition to the above-mentioned circuit blocks 110 to 150, a DC-DC converter, a charge pump, a common voltage generator, a gamma voltage generator, and the like (none is illustrated). These circuit blocks can be implemented by application of well-known technologies, and therefore no detailed description of them will be given.

<Source Driver (Basic Configuration)>

With reference still to FIG. 1, the source driver 130 will be described in detail. In the configuration example being discussed, the source driver 130 includes first latches 131(*), second latches 132(*), DACs 133(*), and amplifiers 134(*) (where * represents "1, 2, . . . N"), and in the diagram, specific numbers are indicated at the top left of the respective blocks).

A first latch 131(*) latches x-bit (for example, x=8) image data D0(*) fed to it via the timing controller 120, and thereby outputs a first, x-bit, data signal D1(*).

A second latch 132(*) latches the first, x-bit, data signal D1(*), and thereby outputs a second, x-bit, data signal D2(*).

A DAC 133(*) converts the second, x-bit, data signal D2(*) into an analog signal A(*) of $2^x$ levels of gradation (for example, 256 levels of gradation).

An amplifier 134(*) receives the analog signal A(*), and outputs a source signal S(*).

<Source Driver (1st Basic Operation)>

Figure 2:
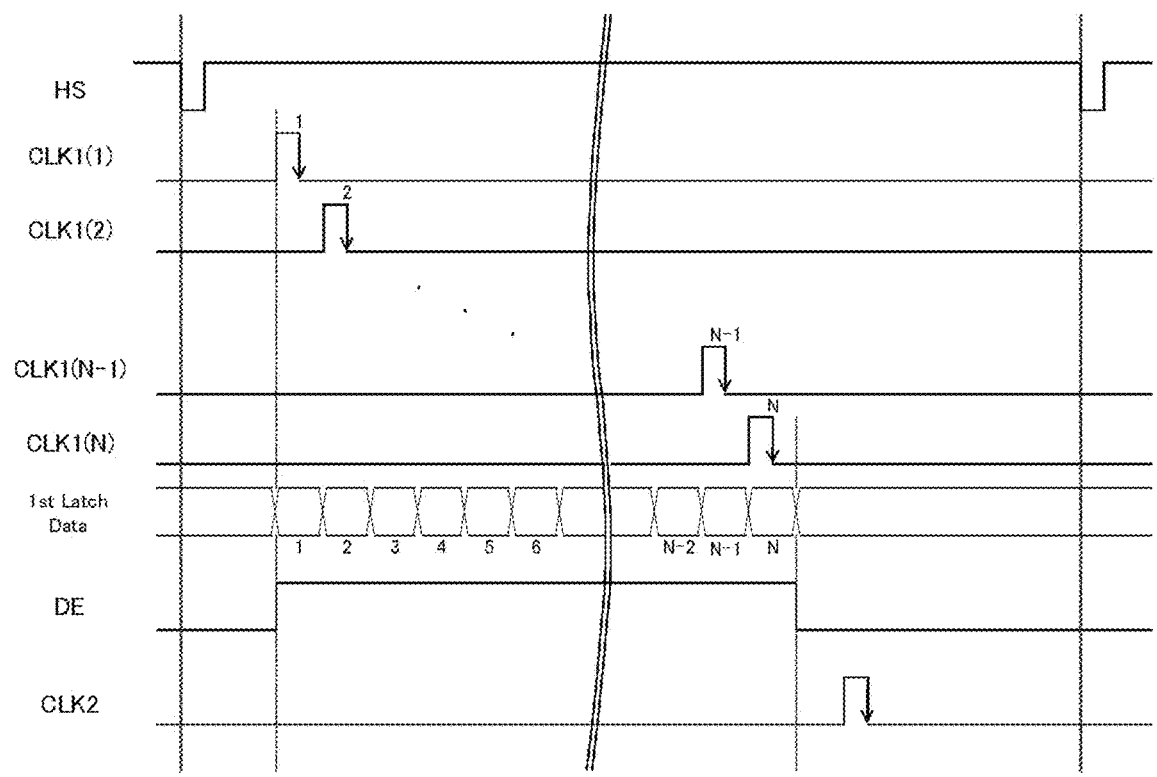
FIG. 2 is a diagram showing first basic operation (simultaneous latch operation) of a source driver.

FIG. 2 is a timing chart showing first basic operation (simultaneous latch operation) of the source driver 130, and depicts, from top down, a horizontal synchronizing signal HS, first clock signals CLK1(1) to CLK1(N), first-latch stored data, a data enable signal DE, and a second clock signal CLK2.

The horizontal synchronizing signal HS is a signal for designating one horizontal period. The first clock signals CLK1(1) to CLK1(N) are signals for designating the latch timing of the first latches 131(1) to 131(N) sequentially. The data enable signal DE is a signal indicating that all the image data within one horizontal period has been stored in the first latches 131(1) to 131(N). The second clock signal CLK2 is a signal for designating the latch timing of the second latches 132(1) to 132(N) collectively.

As shown in the diagram, the image data transferred from the host controller 300 within one horizontal period is subjected to processing such as shuffling by the timing controller 120, and is then stored in the first latches 131(1) to 131(N) sequentially. Once all the image data within one horizontal period has been stored in the first latches 131(1) to 131(N), the stored data is moved to the second latches 132(1) to 132(N), and then the first latches 131(1) to 131(N) go into a standby state waiting for input of the image data in the next horizontal period.

Here, data transfer from the first latches 131(1) to 131(N) to the second latches 132(1) to 132(N) is performed simultaneously for all of the N columns in synchronism with the second clock signal CLK2. Thus, depending on image data, the gradation values of all second data signals D2(1) to D2(N) change simultaneously.

For example, consider a case where the gradation values of the second data signals D2(1) to D2(N) stored in the second latches 132(1) to 132(N) in the previous horizontal period are all "00h" (with "0 (L)" in all bits) and the gradation values of the first data signals D1(1) to D1(N) transferred from the first latches 131(1) to 131(N) in the subsequent horizontal period are all "FFh" (with "1 (H)" in all bits). In this case, the gradation values of the second data signals D2(1) to D2(N) all change from "00h" to "FFh" simultaneously.

Thus, unless some measure is taken, the gradation values of the source signals S(1) to S(N) change simultaneously, and this causes a high peak of EMI.

The following description focuses on the latching operation of the second latches 132(1) to 132(N), and discusses the cause of, and a solution to, a peak of EMI.

<Comparative Examples (Corresponding to Conventional Latch Operation)>

Figure 3:
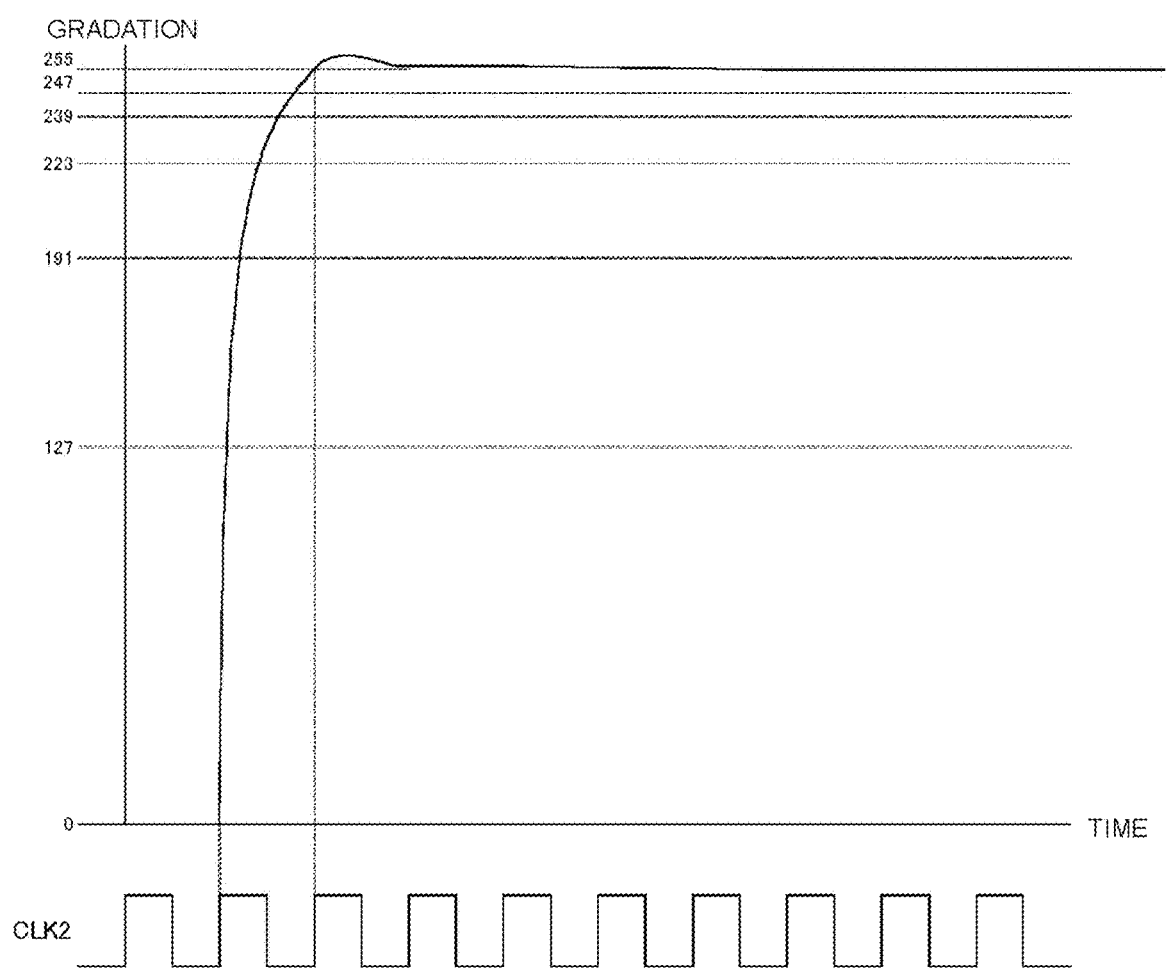
FIG. 3 is a diagram showing an output waveform of a source signal in a first configuration example (all bits every clock, 00h to FFh)

FIG. 3 is a diagram showing a first comparative example of the latch operation by a second latch 132(*); specifically, it shows the output waveform of the source signal S(*) as observed when, during a rewrite of the second data signal D2(*) from "00h" to "FFh", all bits of the first data signal D1(*) are latched simultaneously in synchronism with one clock of the second clock signal CLK2. As shown in the diagram, in the latch operation of the first comparative example, the gradation value of the source signal S(*) rises abruptly from "0d" to "255d".

Figure 4:
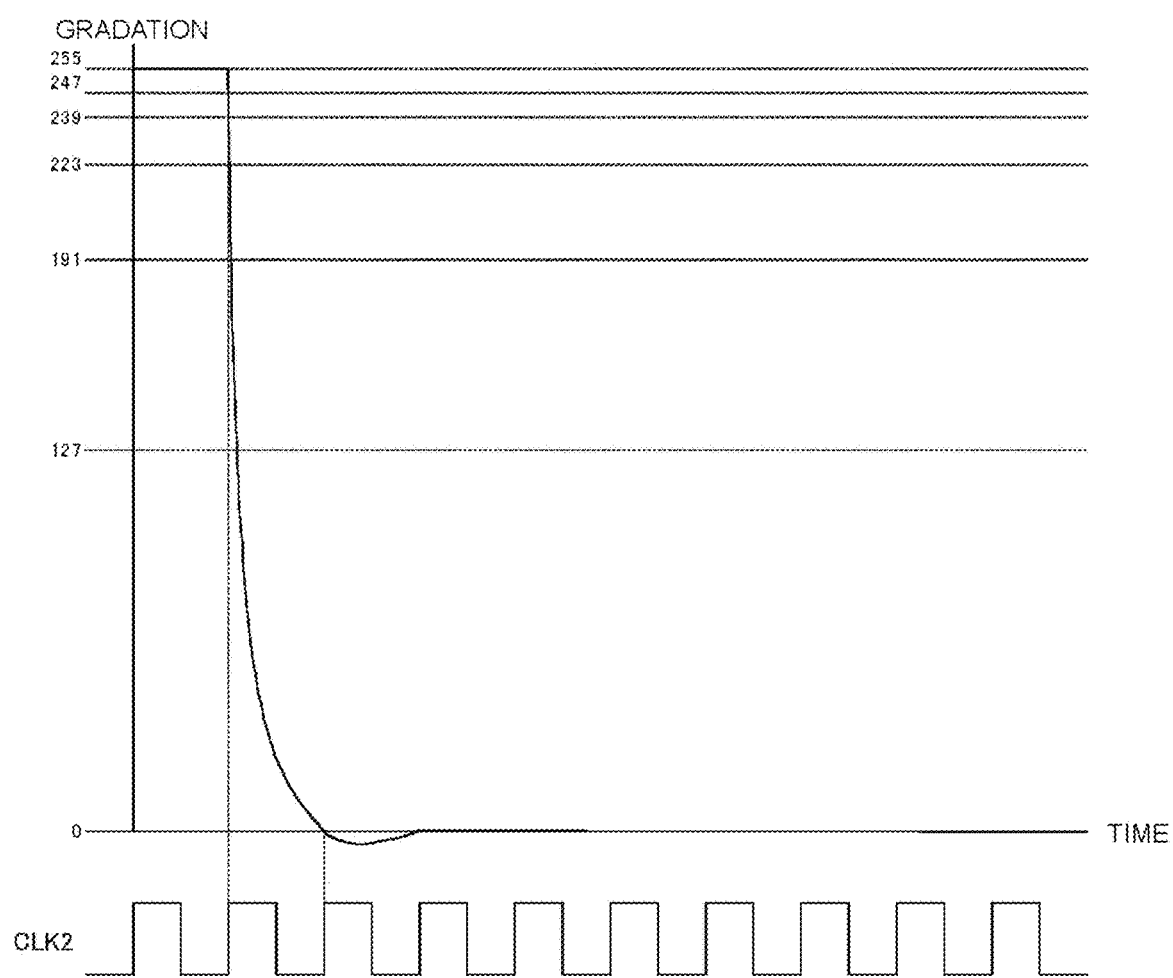
FIG. 4 is a diagram showing an output waveform of a source signal in a second configuration example (all bits every clock, FFh to 00h)

FIG. 4 is a diagram showing a second comparative example of the latch operation by a second latch 132(*); specifically, it shows the output waveform of the source signal S(*) as observed when, during a rewrite of a second data signal D2(*) from "FFh" to "00h", all bits of the first data signal D1(*) are latched simultaneously in synchronism with one clock of the second clock signal CLK2. As shown in the diagram, in the latch operation of the second comparative example, the gradation value of the source signal S(*) falls abruptly from "255d" to "0d".

As described above, in the latch operation of the first or second comparative example, in synchronism with one clock of the second clock signal CLK2, the source signal S(*) changes abruptly from the initial value to the final value. Thus, if data transfer from the first latches 131(1) to 131(N) to the second latches 132(1) to 132(N) is performed simultaneously for all columns, the gradation values of the source signals S(1) to S(N) change simultaneously and abruptly, causing a high peak of EMI.

Diminishing the output capacity of the amplifier 134(*) and thereby reducing the through rate of the source signal S(*) helps the source signal S(*) to rise and fall gently, and thus contributes to a lowered peak of EMI. However, the output adjustment width of the amplifier 134(*) is not very wide, and this makes it difficult to change the through rate of the source signal S(*) over a wide range.

Next, novel latch operation that is adopted in the second latches 132(1) to 132(N) with a view to reducing a peak of EMI will be described in detail.

<Source Driver (Configuration of a Principal Part)>

Figure 5:
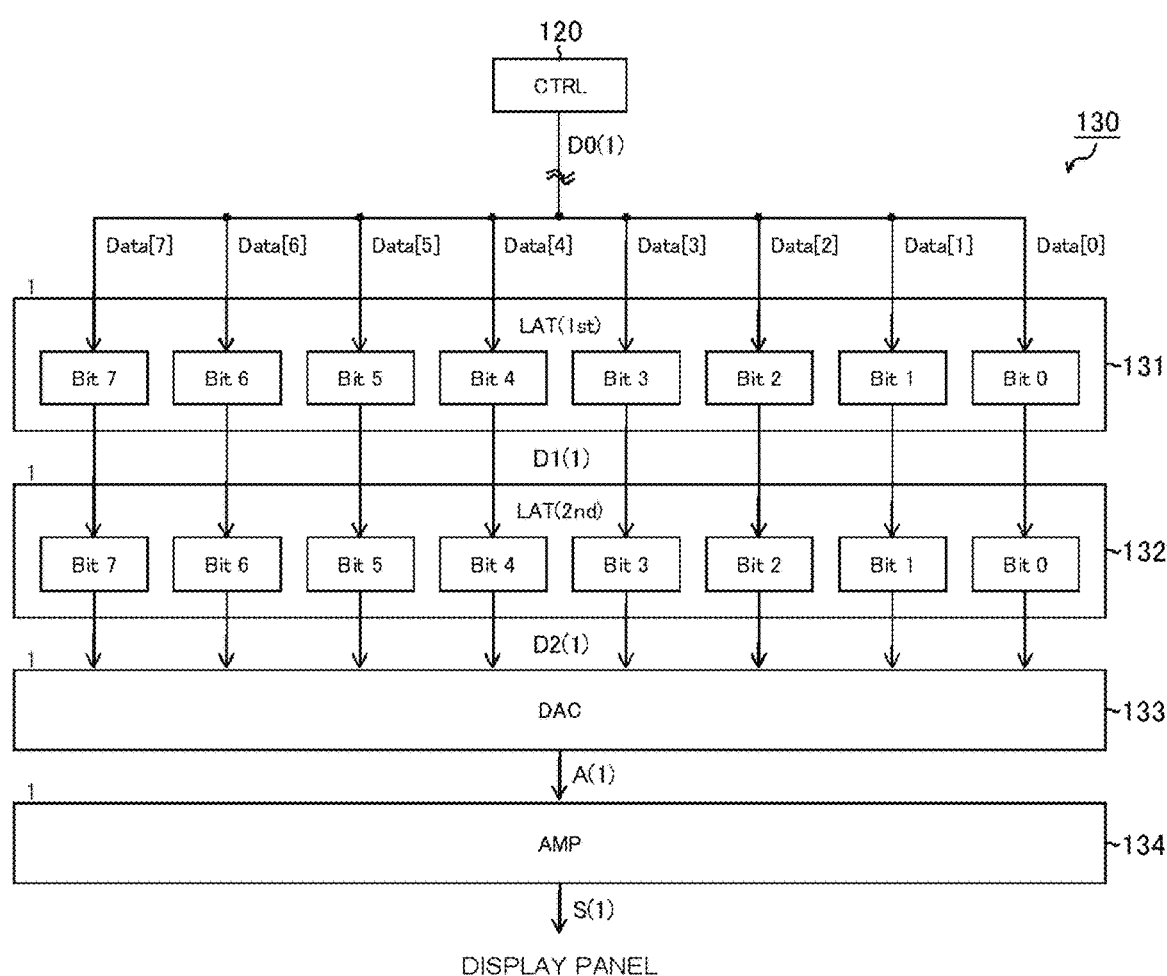
FIG. 5 is a block diagram showing a configuration of a principal part of a source driver.

FIG. 5 is a block diagram (corresponding to an enlarged view inside a broken-line frame a in FIG. 1) of a configuration of a principal part of the source driver 130. The diagram shows, of the constituent elements of the source driver 130, only those in the first column (a first latch 131(1), a second latch 132(1), a DAC 133(1), and an amplifier 134(1)); the constituent elements in the second to Nth columns are similar to their counterparts in the first column, and accordingly no overlapping description will be repeated.

As shown in the diagram, the first latch 131(1) can store eight bits (Bit0 to Bit7) as a first data signal D1(1). Likewise, the second latch 132(1) can store eight bits (Bit0 to Bit7) as a second data signal D2(1).

In conventional latch operation (see the first and second comparative examples described above), all bits of the first data signal D1(1) are latched simultaneously. By contrast, in the novel latch operation, the first data signal D1(1) is latched in a plurality of steps in units of one or more bits. This latch operation will be described below in detail by way of a variety of practical examples.

First Practical Example

Figure 7:
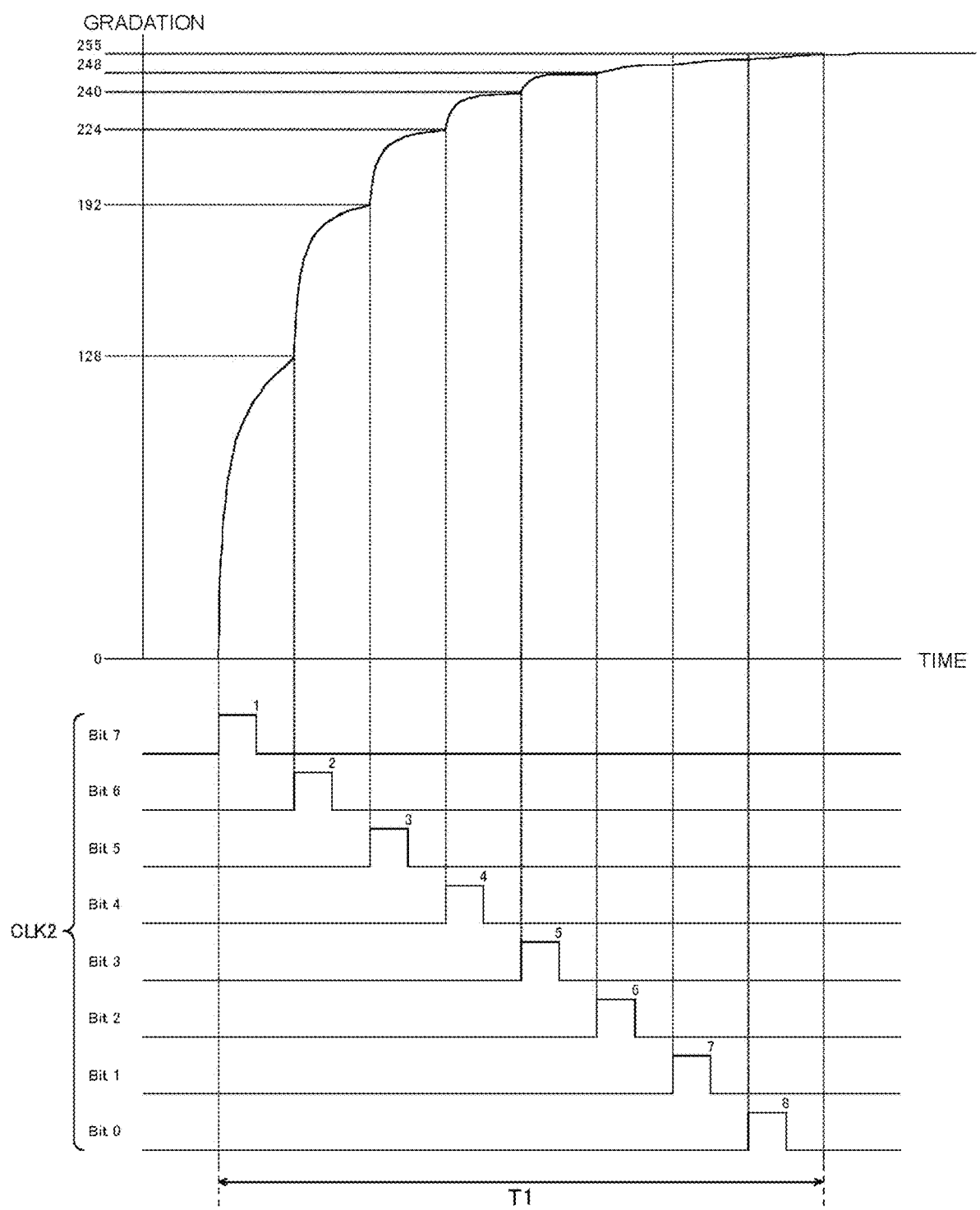
FIG. 7 is a diagram showing an output waveform of a source signal in the first practical example (one bit every clock (MSB to LSB), 00h to FFh)

FIGS. 6 and 7 are diagrams showing a first practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", the first data signal D1(*) is latched sequentially, one bit at a time, from the highest bit (hereinafter "MSB" (most significant bit) to the lowest bit (hereinafter "LSB" (least significant bit) at every clock of the second clock signal CLK2. FIG. 7 depicts the second clock signal CLK2 distributed among individual bits (Bit7 to Bit0).

As shown in the diagrams, in the latch operation of the first practical example, the gradation value of the second data signal D2(*), of which the initial value is "00000000b (00h)", changes, at every clock of the second clock signal CLK2, to "10000000b (80h)" to "11000000b (C0h)" to "11100000b (E0h)" to "11110000b (F0h)" to "11111000b (F8h)" to "11111100b (FCh)" to "11111110b (FEh)" to "11111111b (FFh)". Concurrently, the gradation value of the source signal S(*), of which the initial value is "0d", changes to "128d" to "192d" to "224d" to "240d" to "248d" to "252d" to "254d" to "255d".

Thus, unlike conventional latch operation (see the first or second comparative example described previously), in the latch operation of the first practical example, the timing with which the second latch 132(*) latches the first data signal D1(*) is shifted among bits. This permits the gradation value of the source signal S(*) to be changed stepwise (discretely). It is thus possible to reduce the through rate of the source signal S(*), and hence to lower a peak of EMI.

In the latch operation of the first practical example, the settling period T1 of the source signal S(*) can be set to be about eight periods of the second clock signal CLK2. It is difficult to set such a settling period T1 by adjusting the output of the amplifier 134(*).

Second Practical Example

Figure 9:
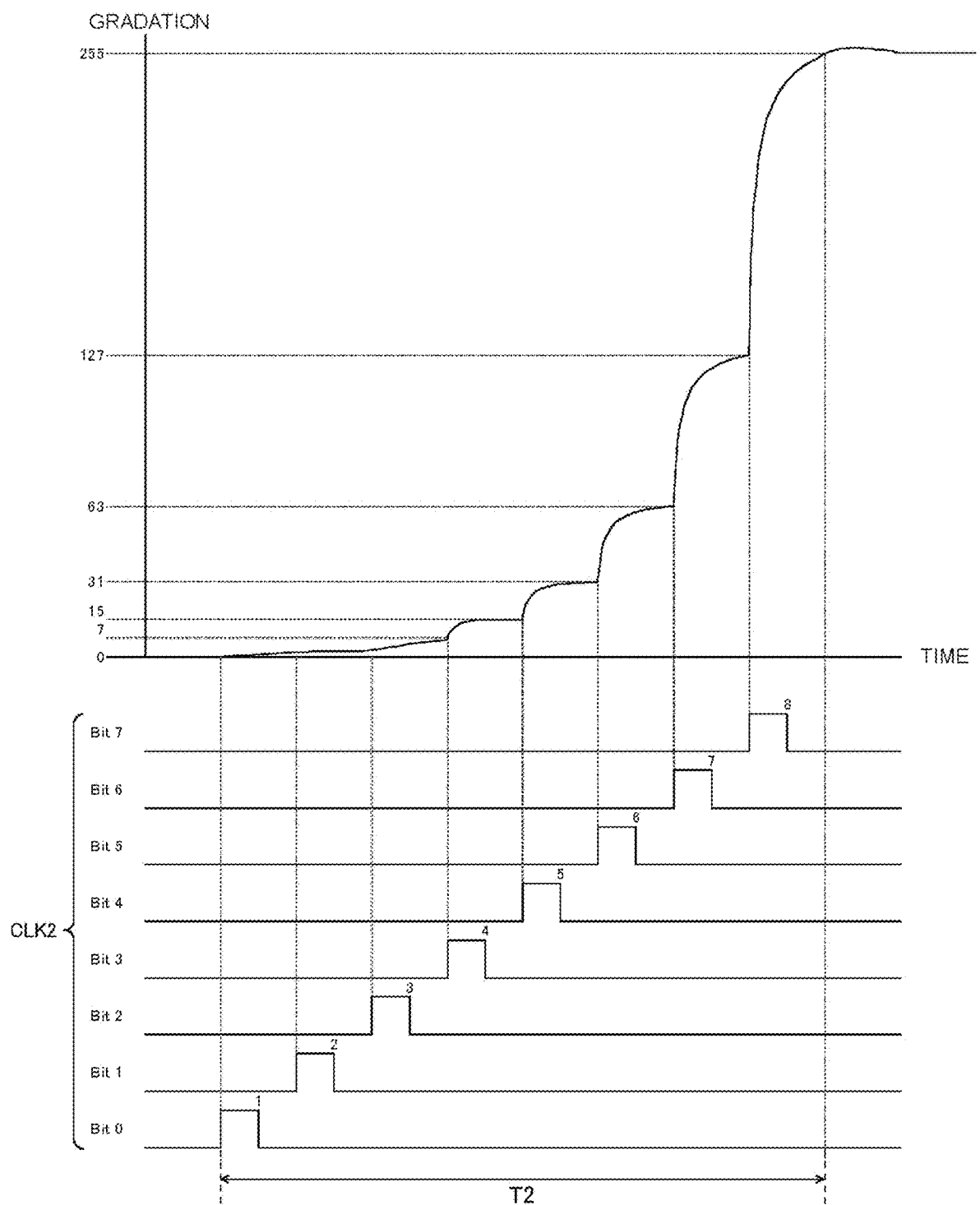
FIG. 9 is a diagram showing an output waveform of a source signal in the second practical example (one bit every clock (LSB to MSB), 00h to FFh)

FIGS. 8 and 9 are diagrams showing a second practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", the first data signal D1(*) is latched sequentially, one bit at a time, from LSB to MSB at every clock of the second clock signal CLK2. FIG. 9 depicts the second clock signal CLK2 distributed among individual bits (Bit7 to Bit0).

As shown in the diagrams, in the latch operation of the second practical example, the gradation value of the second data signal D2(*), of which the initial value is "00000000b (00h)", changes, at every clock of the second clock signal CLK2, to "00000001b (01h)" to "00000011b (03h)" to "00000111b (07h)" to "00001111b (0Fh)" to "00011111b (1Fh)" to "00111111b (3Fh)" to "01111111b (7Fh)" to "11111111b (FFh)". Concurrently, the gradation value of the source signal S(*), of which the initial value is "0d", changes to "1d" to "3d" to "7d" to "15d" to "31d" to "63d" to "127d" to "255d".

Thus, also in the latch operation of the second practical example, as in the first practical example described previously, the timing with which the second latch 132(*) latches the first data signal D1(*) is shifted among bits. This permits the gradation value of the source signal S(*) to be changed stepwise (discretely). It is thus possible to reduce the through rate of the source signal S(*), and hence to lower a peak of EMI.

In the latch operation of the second practical example, as in the first practical example described previously, the settling period T2 of the source signal S(*) can be set to be about eight periods of the second clock signal CLK2. It is difficult to set such a settling period T2 by adjusting the output of the amplifier 134(*).

Third Practical Example

Figure 11:
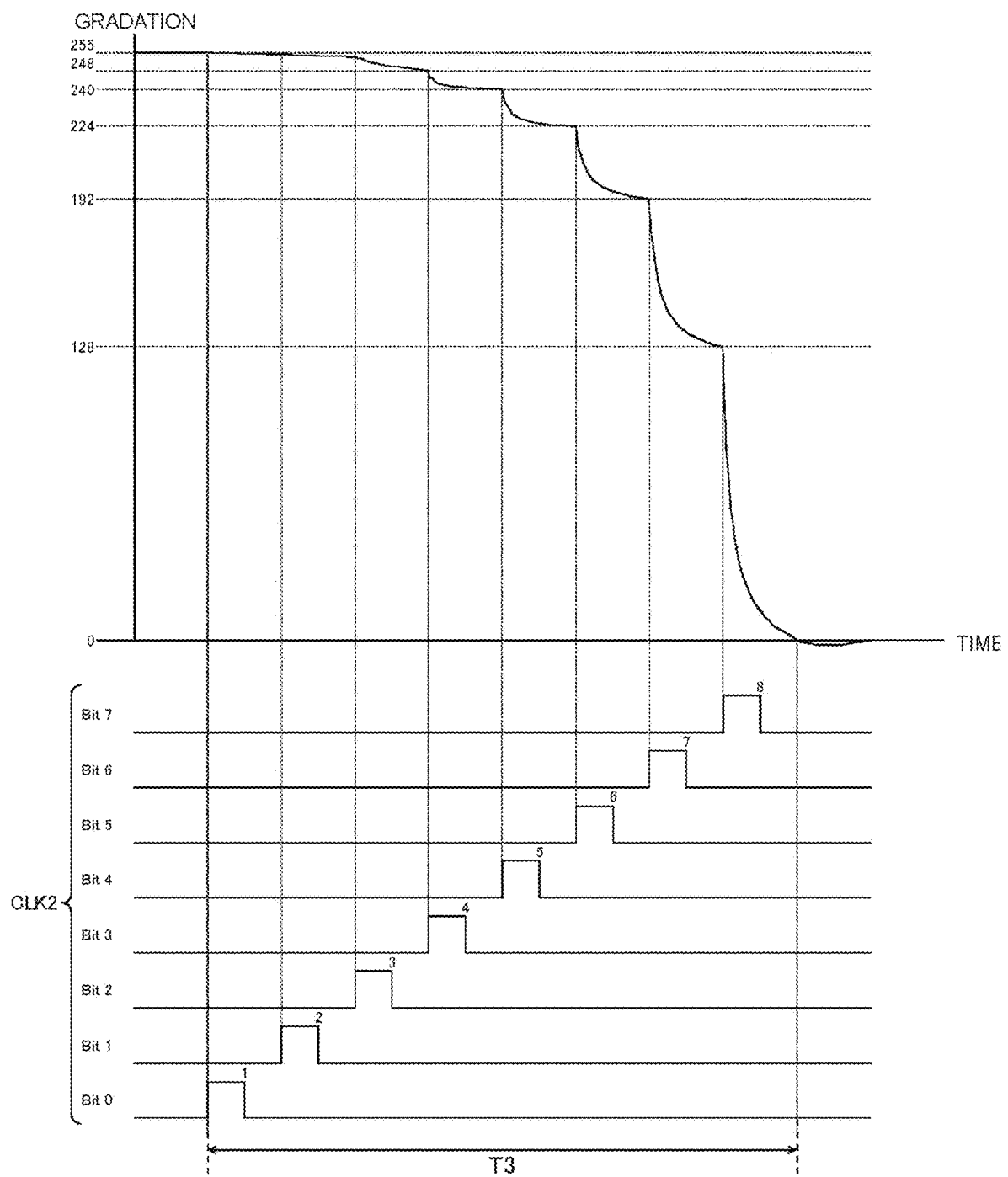
FIG. 11 is a diagram showing an output waveform of a source signal in the third practical example (one bit every clock (LSB to MSB), FFh to 00h)

FIGS. 10 and 11 are diagrams showing a third practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "FFh" to "00h", the first data signal D1(*) is latched sequentially, one bit at a time, from LSB to MSB at every clock of the second clock signal CLK2. FIG. 11 depicts the second clock signal CLK2 distributed among individual bits (Bit7 to Bit0).

As shown in the diagrams, in the latch operation of the third practical example, the gradation value of the second data signal D2(*), of which the initial value is "11111111b (FFh)", changes, at every clock of the second clock signal CLK2, to "11111110b (FEh)" to "11111100b (FCh)" to "11111000b (F8h)" to "11110000b (F0h)" to "11100000b (E0h)" to "11000000b (C0h)" to "10000000b (80h)" to "00000000b (00h)". Concurrently, the gradation value of the source signal S(*), of which the initial value is "255d", changes to "254d" to "252d" to "248d" to "240d" to "224d" to "192d" to "128d" to "0d".

Thus, also in the latch operation of the third practical example, as in the first and second practical examples described previously, the timing with which the second latch 132(*) latches the first data signal D1(*) is shifted among bits. This permits the gradation value of the source signal S(*) to be changed stepwise (discretely). It is thus possible to reduce the through rate of the source signal S(*), and hence to lower a peak of EMI.

In the latch operation of the third practical example, as in the first and second practical examples described previously, the settling period T3 of the source signal S(*) can be set to be about eight periods of the second clock signal CLK2. It is difficult to set such a settling period T3 by adjusting the output of the amplifier 134(*).

Fourth Practical Example

Figure 13:
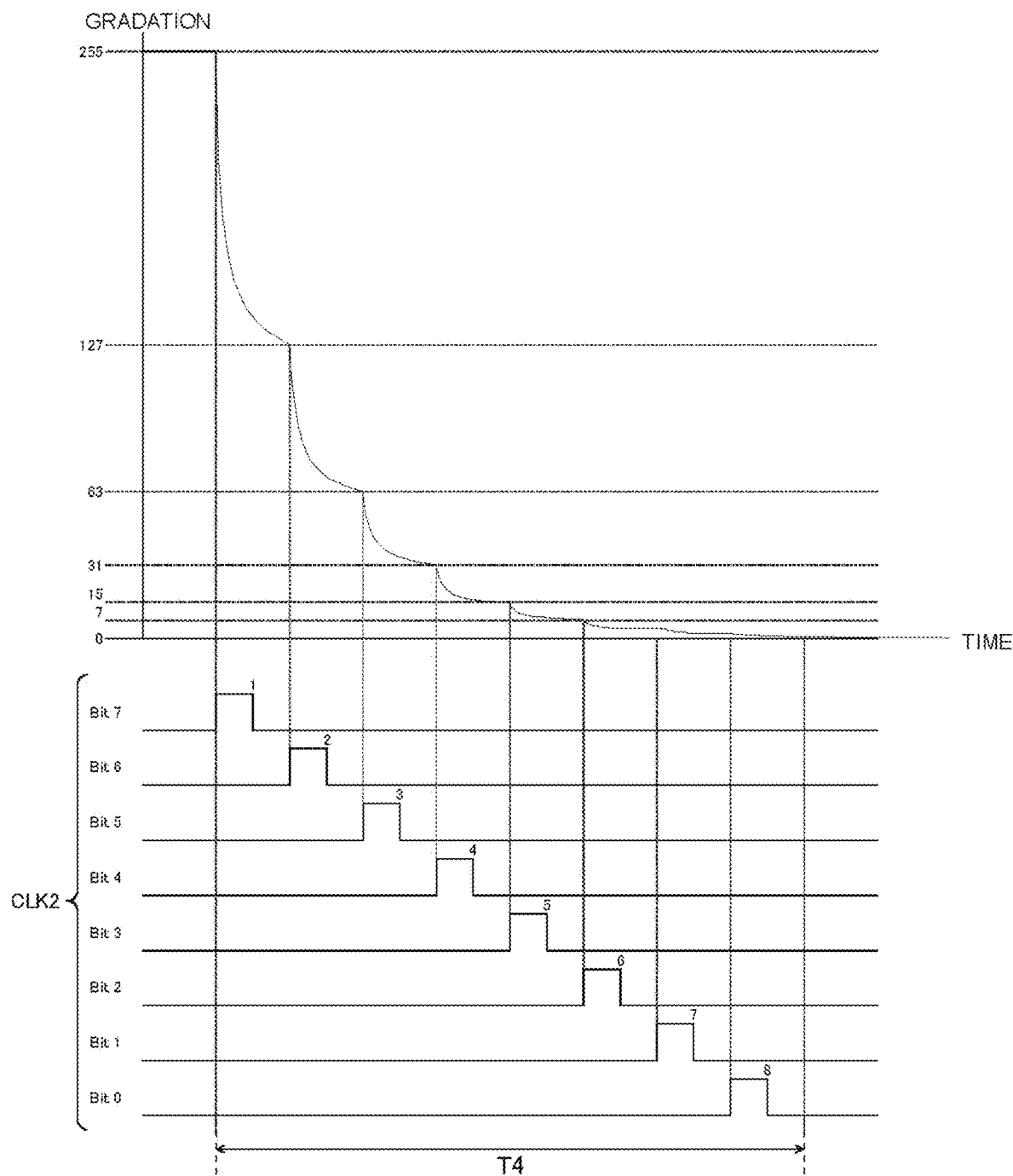
FIG. 13 is a diagram showing an output waveform of a source signal in the fourth practical example (one bit every clock (MSB to LSB), FFh to 00h)

FIGS. 12 and 13 are diagrams showing a fourth practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "FFh" to "00h", the first data signal D1(*) is latched sequentially, one bit at a time, from MSB to LSB at every clock of the second clock signal CLK2. FIG. 13 depicts the second clock signal CLK2 distributed among individual bits (Bit7 to Bit0).

As shown in the diagrams, in the latch operation of the fourth practical example, the gradation value of the second data signal D2(*), of which the initial value is "11111111b (FFh)", changes, at every clock of the second clock signal CLK2, to "01111111b (7Fh)" to "00111111b (3Fh)" to "00011111b (1Fh)" to "00001111b (0Fh)" to "00000111b (07h)" to "00000011b (03h)" to "00000001b (01h)" to "00000000b (00h)". Concurrently, the gradation value of the source signal S(*), of which the initial value is "255d", changes to "127d" to "63d" to "31d" to "15d" to "7d" to "3d" to "1d" to "0d".

Thus, also in the latch operation of the fourth practical example, as in the first to third practical examples described previously, the timing with which the second latch 132(*) latches the first data signal D1(*) is shifted among bits. This permits the gradation value of the source signal S(*) to be changed stepwise (discretely). It is thus possible to reduce the through rate of the source signal S(*), and hence to lower a peak of EMI.

In the latch operation of the fourth practical example, as in the first to third practical examples described previously, the settling period T4 of the source signal S(*) can be set to be about eight periods of the second clock signal CLK2. It is difficult to set such a settling period T4 by adjusting the output of the amplifier 134(*).

Fifth Practical Example

Figure 15:
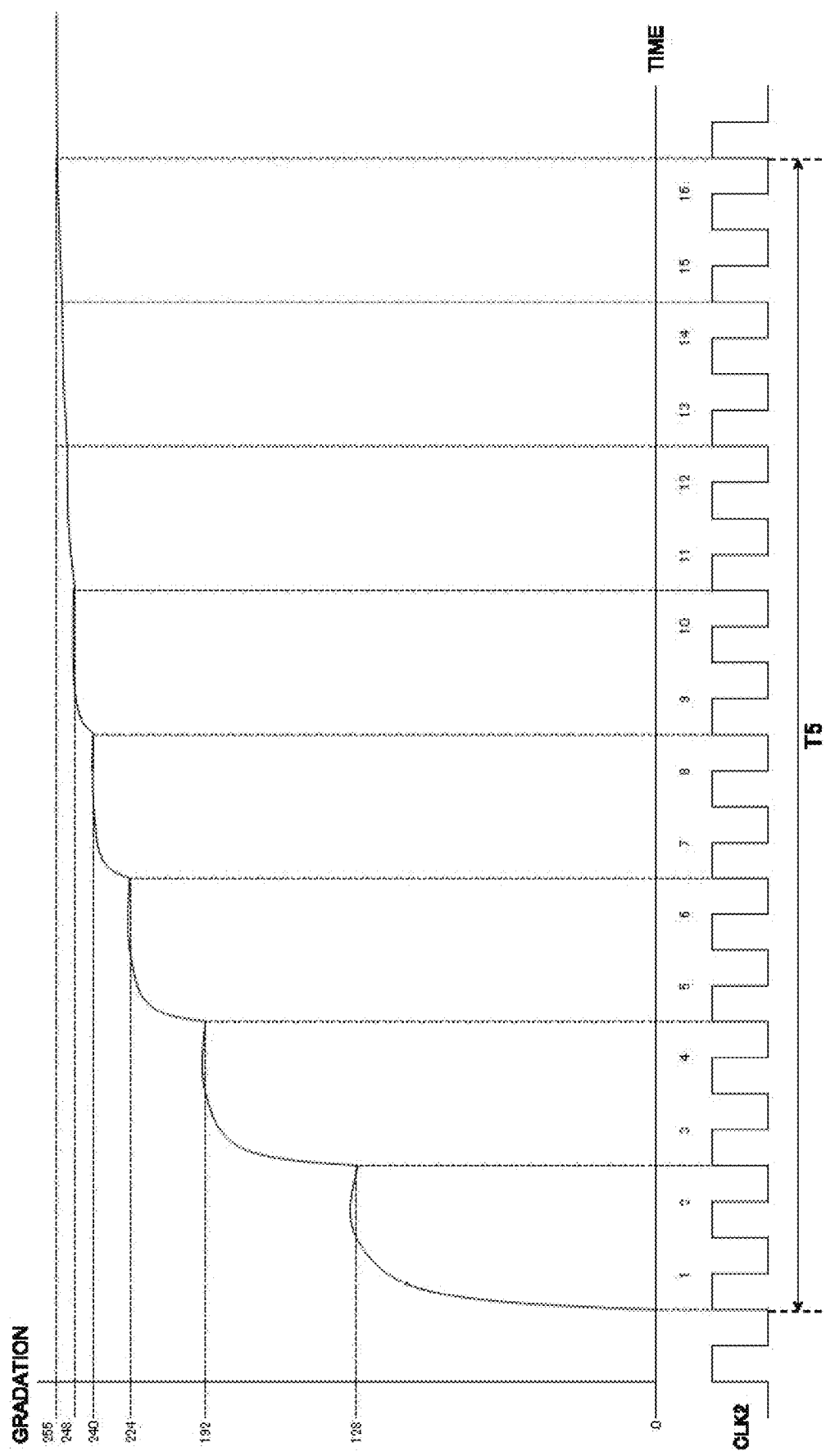
FIG. 15 is a diagram showing an output waveform of a source signal in the fifth practical example (one bit every two clocks (MSB to LSB), 00h to FFh)

FIGS. 14 and 15 are diagrams showing a fifth practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", the first data signal D1(*) is latched sequentially, one bit at a time, from MSB to LSB at every two clocks of the second clock signal CLK2.

As shown in the diagrams, in the latch operation of the fifth practical example, the gradation value of the second data signal D2(*), of which the initial value is "00000000b (00h)", changes, at every two clocks of the second clock signal CLK2, to "10000000b (80h)" to "11000000b (C0h)" to "11100000b (E0h)" to "11110000b (F0h)" to "11111000b (F8h)" to "11111100b (FCh)" to "11111110b (FEh)" to "11111111b (FFh)". Concurrently, the gradation value of the source signal S(*), of which the initial value is "0d", changes to "128d" to "192d" to "224d" to "240d" to "248d" to "252d" to "254d" to "255d".

Thus, with the latch operation of the fifth practical example, it is possible to change the gradation value of the source signal S(*) more gently than in the first practical example (see FIGS. 6 and 7) described previously. Accordingly, in a case where the source signal S(*) has an ample settling period, by using the latch operation of the fifth practical example, it is possible to further reduce the through rate of the source signal S(*), and hence to further lower a peak of EMI.

In the latch operation of the fifth practical example, the settling period T5 of the source signal S(*) can be set to be about 16 periods of the second clock signal CLK2 (that is, about twice the settling period T1 in the latch operation of the first practical example). It is difficult to set such a settling period T5 by adjusting the output of the amplifier 134(*).

Sixth Practical Example

Figure 17:
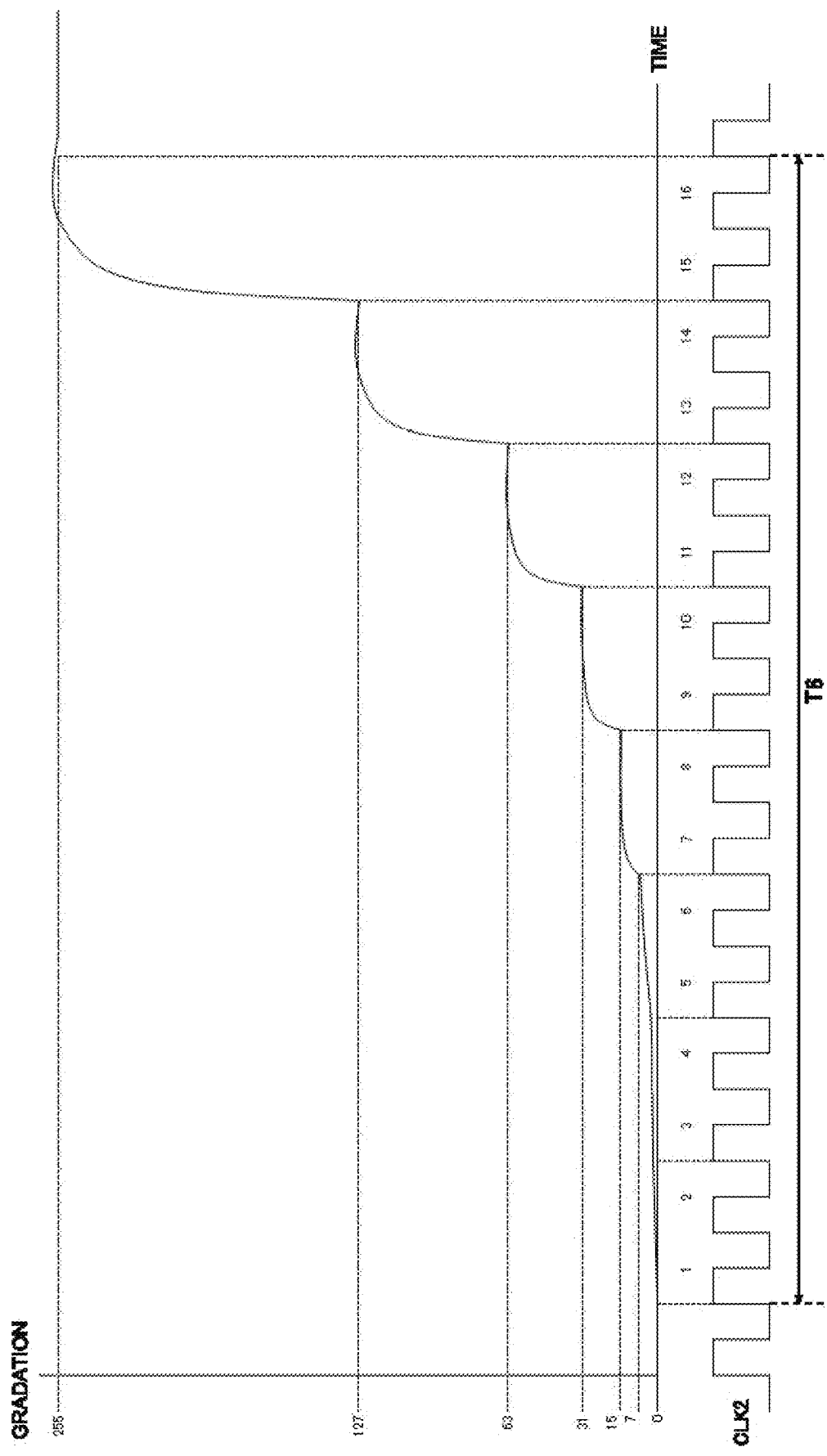
FIG. 17 is a diagram showing an output waveform of a source signal in the sixth practical example (one bit every two clocks (LSB to MSB), 00h to FFh)

FIGS. 16 and 17 are diagrams showing a sixth practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", the first data signal D1(*) is latched sequentially, one bit at a time, from MSB to LSB at every two clocks of the second clock signal CLK2.

As shown in the diagrams, in the latch operation of the sixth practical example, the gradation value of the second data signal D2(*), of which the initial value is "00000000b (00h)", changes, at every two clocks of the second clock signal CLK2, to "00000001b (01h)" to "00000011b (03h)" to "00000111b (07h)" to "00001111b (0Fh)" to "00011111b (1Fh)" to "00111111b (3Fh)" to "01111111b (7Fh)" to "11111111b (FFh)". Concurrently, the gradation value of the source signal S(*), of which the initial value is "0d", changes to "1d" to "3d" to "7d" to "15d" to "31d" to "63d" to "127d" to "255d".

Thus, with the latch operation of the sixth practical example, it is possible to change the gradation value of the source signal S(*) more gently than in the second practical example (see FIGS. 8 and 9) described previously. Accordingly, in a case where the source signal S(*) has an ample settling period, by using the latch operation of the sixth practical example, it is possible to further reduce the through rate of the source signal S(*), and hence to further lower a peak of EMI.

In the latch operation of the sixth practical example, as in the fifth practical example described previously, the settling period T6 of the source signal S(*) can be set to be about 16 periods of the second clock signal CLK2 (that is, about twice the settling period T2 in the latch operation of the second practical example). It is difficult to set such a settling period T6 by adjusting the output of the amplifier 134(*).

The latch operation of the fifth and sixth practical examples assumes, as an example, a configuration where the first data signal D1(*) is latched one bit at a time every time two clocks of the second clock signal CLK2 are fed in. Instead, in a case where the through rate of the source signal S(*) needs to be further reduced, it is possible to use a configuration where the first data signal D1(*) is latched one bit at a time every time three (or more, that is, a plurality of) clocks of the second clock signal CLK2 are fed in.

Seventh Practical Example

Figure 19:
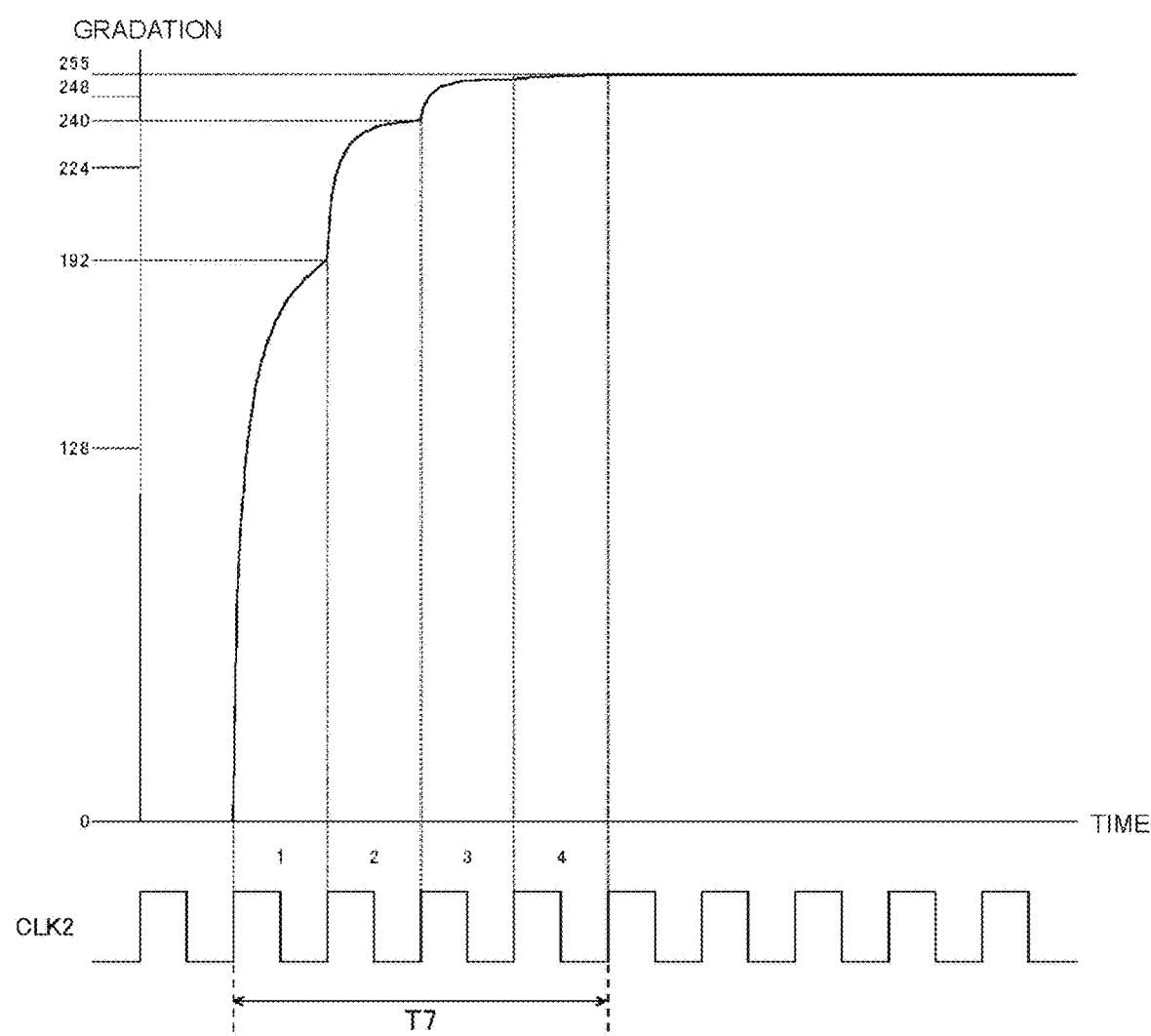
FIG. 19 is a diagram showing an output waveform of a source signal in the seventh practical example (two bits every clock (MSB to LSB), 00h to FFh)

FIGS. 18 and 19 are diagrams showing a seventh practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", the first data signal D1(*) is latched sequentially, two bits at a time, from MSB to LSB at every clock of the second clock signal CLK2.

As shown in the diagrams, in the latch operation of the seventh practical example, the gradation value of the second data signal D2(*), of which the initial value is "00000000b (00h)", changes, at every clock of the second clock signal CLK2, to "11000000b (C0h)" to "11110000b (F0h)" to "11111100b (FCh)" to "11111111b (FFh)". Concurrently, the gradation value of the source signal S(*), of which the initial value is "0d", changes to "192d" to "240d" to "252d" to "255d".

Thus, with the latch operation of the seventh practical example, it is possible to change the gradation value of the source signal S(*) more sharply than in the first practical example (see FIGS. 6 and 7) described previously. Accordingly, in a case where the source signal S(*) has a tight settling period, by using the latch operation of the seventh practical example, it is possible to reduce the through rate of the source signal S(*) within the permissible range, and hence to lower a peak of EMI adequately.

In the latch operation of the seventh practical example, the settling period T7 of the source signal S(*) can be set to be about four periods of the second clock signal CLK2 (that is, about one-half of the settling period T1 in the latch operation of the first practical example).

Eighth Practical Example

Figure 21:
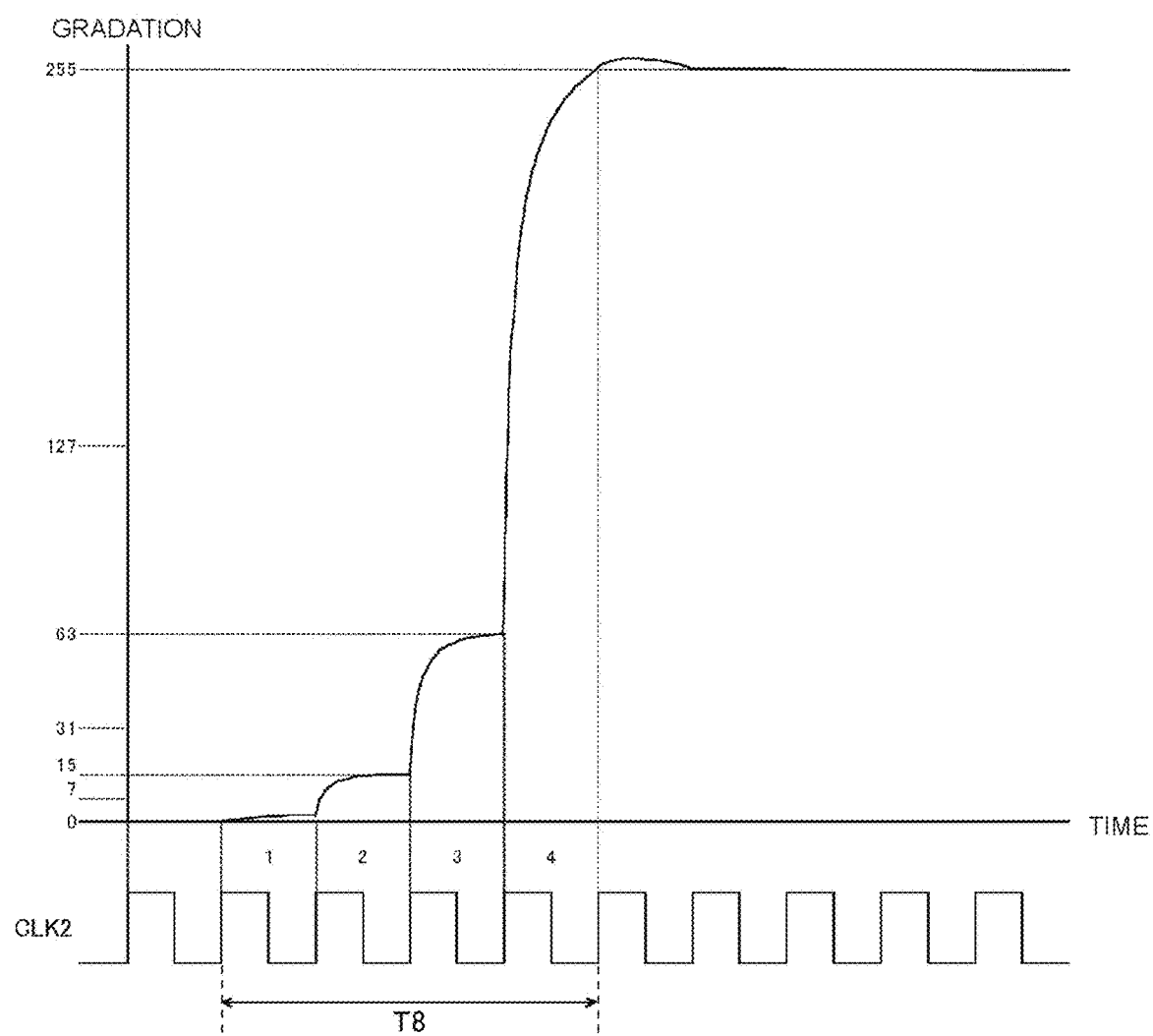
FIG. 21 is a diagram showing an output waveform of a source signal in the eighth practical example (two bits every clock (LSB to MSB), 00h to FFh)

FIGS. 20 and 21 are diagrams showing an eighth practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", the first data signal D1(*) is latched sequentially, two bits at a time, from LSB to MSB at every clock of the second clock signal CLK2.

As shown in the diagrams, in the latch operation of the eighth practical example, the gradation value of the second data signal D2(*), of which the initial value is "00000000b (00h)", changes, at every clock of the second clock signal CLK2, to "00000011b (03h)" to "00001111b (0Fh)" to "00111111b (3Fh)" to "11111111b (FFh)". Concurrently, the gradation value of the source signal S(*), of which the initial value is "0d", changes to "3d" to "15d" to "63d" to "255d".

Thus, with the latch operation of the eighth practical example, it is possible to change the gradation value of the source signal S(*) more sharply than in the second practical example (see FIGS. 8 and 9) described previously. Accordingly, in a case where the source signal S(*) has a tight settling period, by using the latch operation of the eighth practical example, it is possible to reduce the through rate of the source signal S(*) within the permissible range, and hence to lower a peak of EMI adequately.

In the latch operation of the eighth practical example, as in the seventh practical example described previously, the settling period T8 of the source signal S(*) can be set to be about four periods of the second clock signal CLK2 (that is, about one-half of the settling period T2 in the latch operation of the second practical example).

The latch operation of the seventh and eighth practical examples assumes, as an example, a configuration where the first data signal D1(*) is latched two bits at a time every time one clock of the second clock signal CLK2 is fed in. Instead, in a case where the through rate of the source signal S(*) needs to be further increased, it is possible to use a configuration where the first data signal D1(*) is latched three (or more, that is, a plurality of) bits every time one clock of the second clock signal CLK2 is fed in.

Ninth Practical Example

Figure 23:
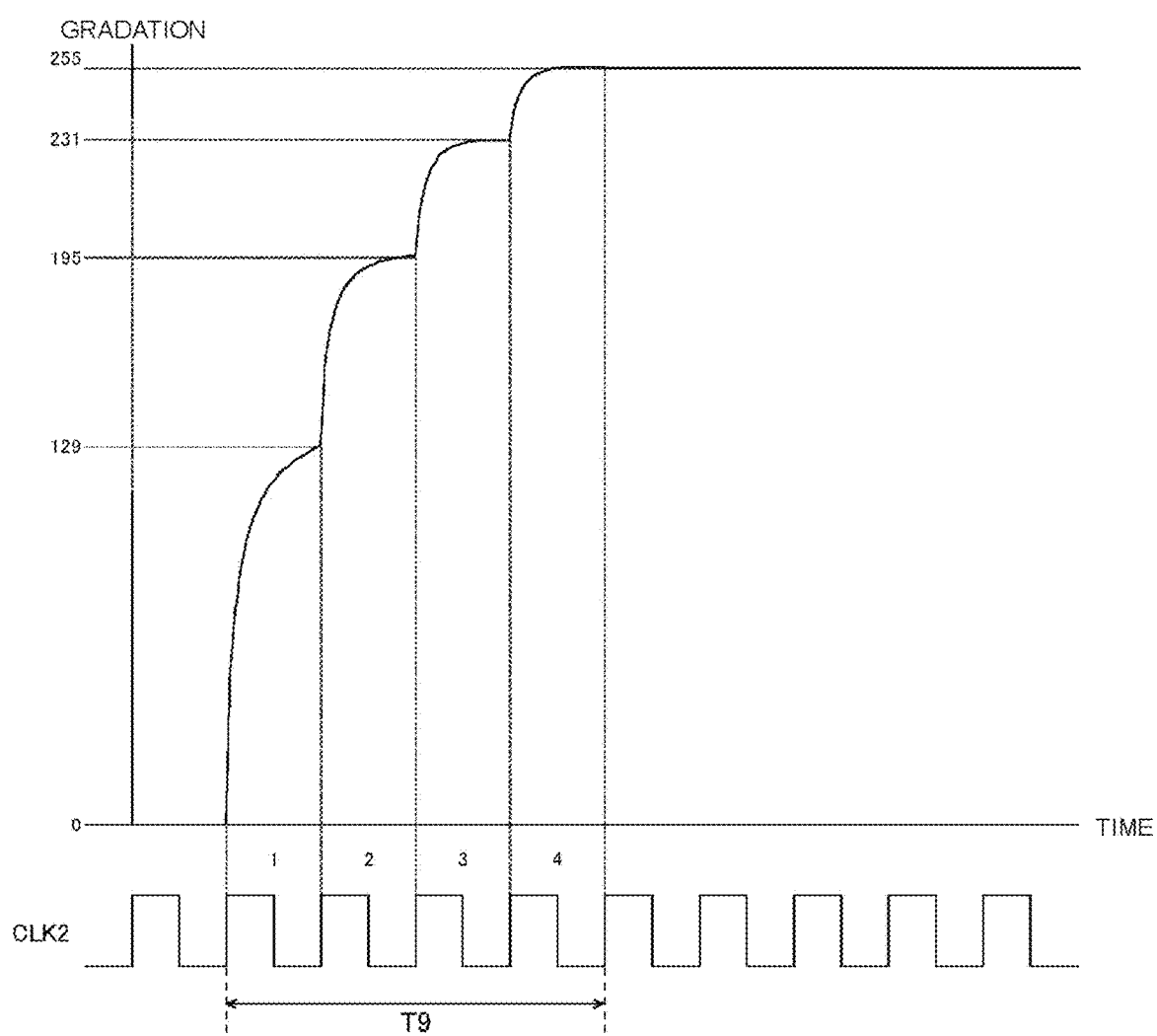
FIG. 23 is a diagram showing an output waveform of a source signal in the ninth practical example (two bits every clock (0 & 7, then 1 & 6, then 2 & 5, then 3 & 4), 00h to FFh)

FIGS. 22 and 23 are diagrams showing a ninth practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", of all the bits of the first data signal D1(*), the highest and lowest of unlatched bits are latched simultaneously, two at a time, at every clock of the second clock signal CLK2.

As shown in the diagrams, in the latch operation of the ninth practical example, the gradation value of the second data signal D2(*), of which the initial value is "00000000b (00h)", changes, at every clock of the second clock signal CLK2, to "10000001b (81h)" to "11000011b (C3h)" to "11100111b (E7h)" to "11111111b (FFh)". Concurrently, the gradation value of the source signal S(*), of which the initial value is "0d", changes to "129d" to "195d" to "231d" to "255d".

Thus, in the latch operation of the ninth practical example, one combination after another of the highest and lowest of unlatched bits is latched sequentially (more specifically, Bit7 and Bit0, then Bit6 and Bit1, then Bit5 and Bit2, and then Bit4 and Bit3). This helps eliminate periods where the gradation value of the source signal S(*) hardly changes (that is, periods where lower bits are latched one at a time), and it is thus possible to alleviate the variation of the change in the gradation value per clock.

In the latch operation of the ninth practical example, as in the seventh and eighth practical examples described previously, the settling period T9 of the source signal S(*) can be set to be about four periods of the second clock signal CLK2. Accordingly, even in a case where the source signal S(*) has a tight settling period, it is possible, by reducing the through rate of the source signal S(*) within the permissible range, to lower a peak of EMI adequately.

Tenth Practical Example

Figure 25:
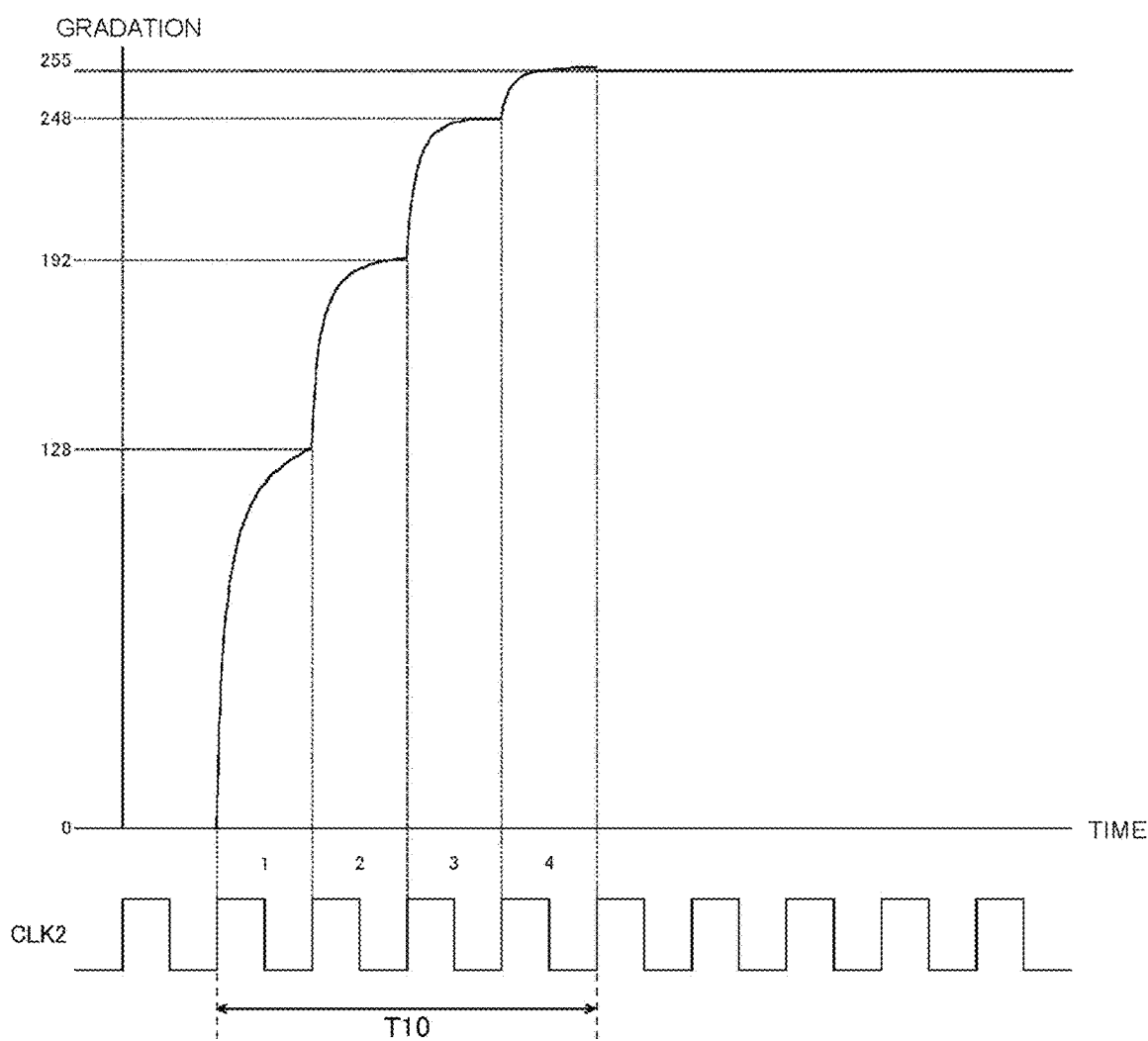
FIG. 25 is a diagram showing an output waveform of a source signal in the ninth practical example (one bit every clock or three bits every clock (7, then 6, then 3, 4, & 5, then 0, 1, & 2), 00h to FFh)

FIGS. 24 and 25 are diagrams showing a tenth practical example of the latch operation by the second latch 132(*); specifically, they respectively show the gradation value of the second data signal D2(*) (in binary, hexadecimal, and decimal notations) and the output waveform of the source signal S(*) as observed when, during a rewrite of the second data signal D2(*) from "00h" to "FFh", the highest two bits of the first data signal D1(*) are latched one after the other at every clock of the second clock signal CLK2 and then the lowest six bits of the first data signal D1(*) are latched three bits at a time.

As shown in the diagrams, in the latch operation of the tenth practical example, the gradation value of the second data signal D2(*), of which the initial value is "00000000b (00h)", changes, at every clock of the second clock signal CLK2, to "10000000b (80h)" to "11000000b (C0h)" to "11111000b (F8h)" to "11111111b (FFh)". Concurrently, the gradation value of the source signal S(*), of which the initial value is "0d", changes to "128d" to "192d" to "248d" to "255d".

Thus, in the latch operation of the tenth practical example, of all the bits of the first data signal D1(*), the lower bits are, in the larger number they are latched simultaneously. This, as in the ninth practical example described previously, helps eliminate periods where the gradation value of the source signal S(*) hardly changes (that is, periods where lower bits are latched one at a time), and it is thus possible to alleviate the variation of the change in the gradation value per clock.

In the latch operation of the tenth practical example, as in the seventh to ninth practical examples described previously, the settling period T10 of the source signal S(*) can be set to be about four periods of the second clock signal CLK2. Accordingly, even in a case where the source signal S(*) has a tight settling period, it is possible, by reducing the through rate of the source signal S(*) within the permissible range, to lower a peak of EMI adequately.

<Modified Examples of Latch Operation>

The variety of practical examples described thus far deal with, as examples, configurations where the latch operation by the second latch 132(*) proceeds by latching the first data signal D1(*) in units of one or more bits, like one bit at every clock, one bit at every plurality of clocks, or a plurality of bits at every clock. It would be easily understood, even with no further practical examples being presented, that the technical idea involved can be expanded to encompass configurations where the first data signal D1(*) is latched a plurality of bits at every plurality of clocks (for example, three bits at every two clocks).

The variety of practical examples described thus far can be implemented in any combination so long as their respective operation does not contradict with each other. For example, of the latch operation period in which the second latch 132(*) latches the first data signal D1(*), the first half may be allocated to the latch operation of the first practical example (MSB to LSB) and the latter half may be allocated to the latch operation of the second practical example (LSB to MSB). For another example, the latch operation period of the second latch 132(*) may be divided into three parts, namely a first to a third period, with the first period allocated to the latch operation of the first practical example (one bit at every clock), the second period allocated to the latch operation of the fifth practical example (one bit at every two clocks), and the third period allocated to the latch operation of the seventh practical example (two bits at every clock).

Studying the practical and modified examples of latch operation described above leads to the following conclusion: the least requirement is that the second latch 132(*) outputs the second data signal D2(*) by latching the first data signal D1(*) in a plurality of steps in units of one or more bits; thus, in what combination to shift bits during the latch operation period can be determined freely.

For example, the latch operation of the tenth practical example may instead comprise latching the first data signal D1(*) in two steps by first latching only the highest bit in synchronism with a first clock and then latching all the other bits in synchronism with a second clock.

For another example, although the latch operation of the tenth practical example is so configured that, of all the bits of the first data signal D1(*), the lower bits are, in the larger number they are latched simultaneously, this is not meant to consciously exclude from the scope of the present invention a configuration where, instead, the upper bits are, in the larger number they are latched simultaneously.

<Setting Switching Control>

Figure 26:
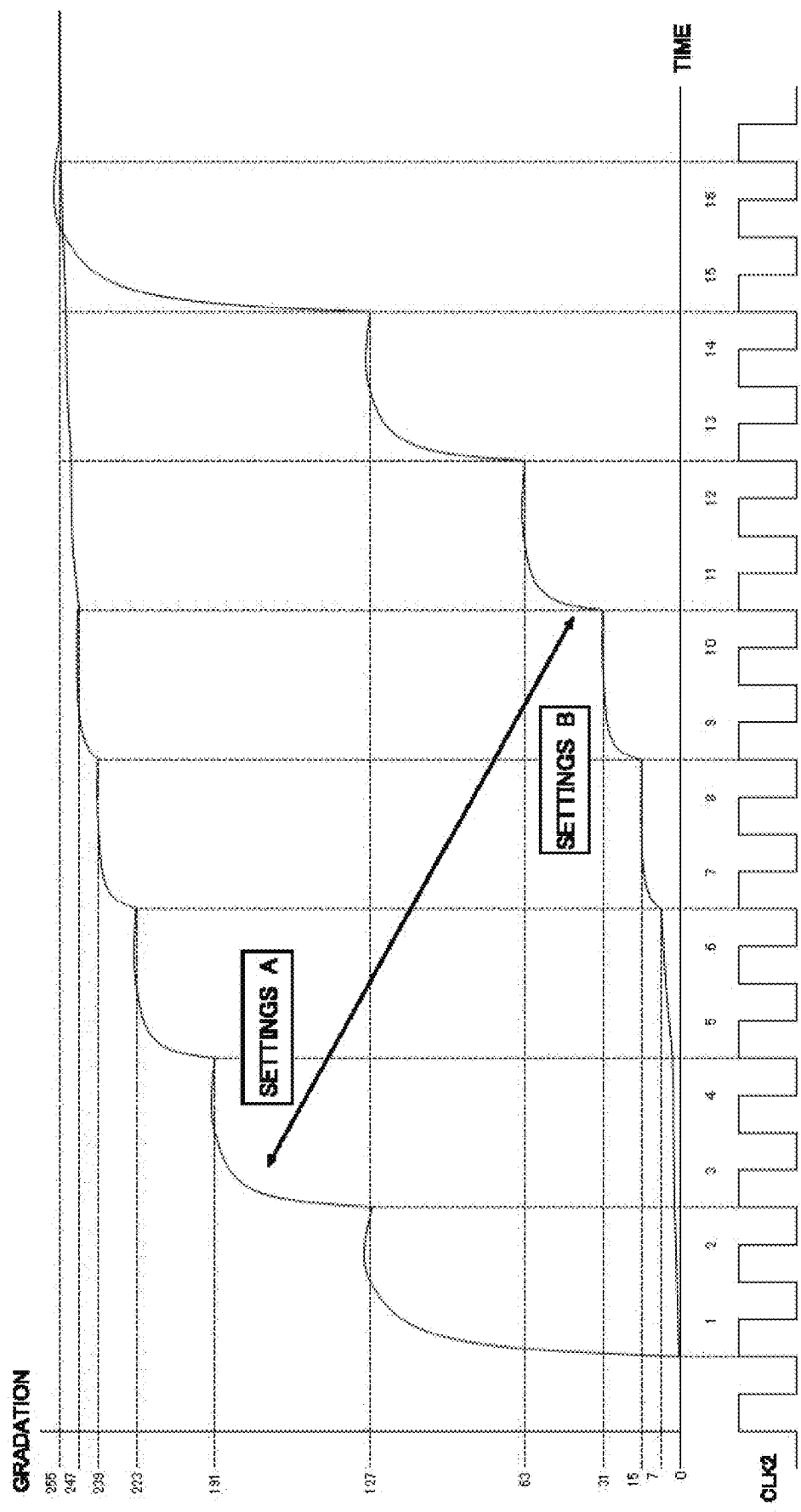
FIG. 26 is a diagram showing one example of setting switching control.

FIG. 26 is a diagram showing one example of setting switching control for the latch operation by the second latch 132(*). The diagram depicts, in a superimposed fashion, the source output waveform resulting from the latch operation of the fifth practical example, indicated as Settings A, and the source output waveform resulting from the latch operation of the sixth practical example, indicated as Settings B.

As will be clear from the diagram, with different settings, the latch operation by the second latch 132(*) naturally yields different source output waveforms. Accordingly, for example, by using Settings A and B alternately between adjacent ones of the second latches 132(1) to 132(N) in N columns, or by switching between Settings A and B alternately every predetermined period (for example, horizontal period or vertical period), it is possible to diffuse the frequency components of EMI, and thereby to further lower a peak of EMI.

<Source Driver (Second Basic Operation)>

Figure 27:
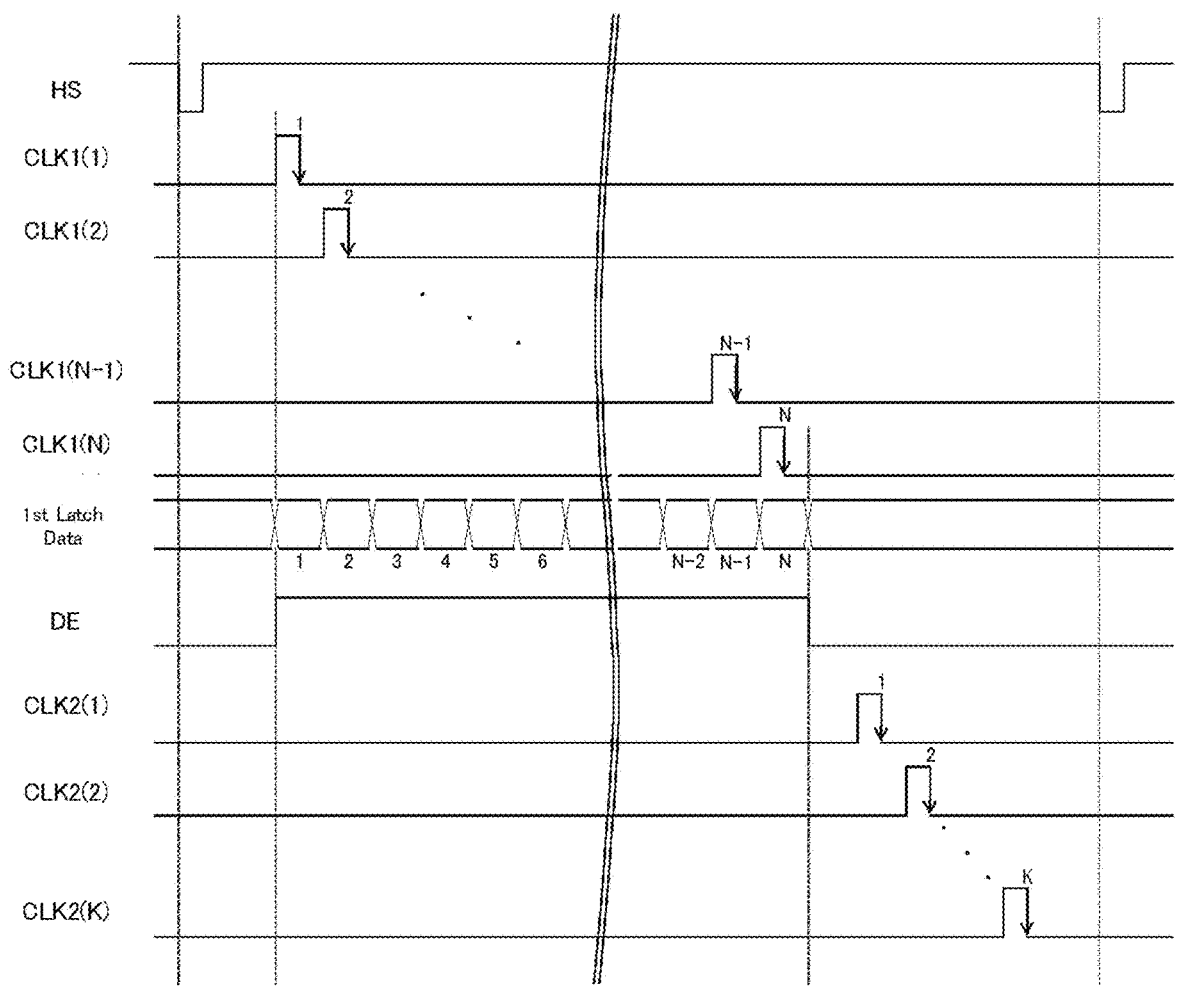
FIG. 27 is a diagram showing second basic operation (time-division latch operation) of a source driver.

FIG. 27 is a timing chart showing second basic operation (time-division latch operation) of the source driver 130, and depicts, from top down, a horizontal synchronizing signal HS, first clock signals CLK1(1) to CLK1(N), first-latch stored data, a data enable signal DE, and second clock signals CLK2(1) to CLK2(N).

In the first basic operation (FIG. 2) described previously, in synchronism with the second clock signal CLK2, the latch operation by the second latches 132(1) to 132(N) is started simultaneously for all columns. By contrast, in the source driver 130 that is configured to perform the second basic operation, the second latches 132(1) to 132(N) in N columns are divided into K groups (where K≥2), and in synchronism with the second clock signals CLK2(1) to CLK2(K), the latch operation is started with timing shifted among those groups.

For example, of the second latches 132(1) to 132(N), those in the first to 120th columns start latch operation in synchronism with the second clock signal CLK2(1), and those in the 121st to 240th columns start latch operation in synchronism with the second clock signal CLK2(2). The second latches in the rest of the columns operate likewise: those in the (N−199)th to Nth columns start latch operation in synchronism with the second clock signal CLK2(K).

With time-division latch operation as described above, it is possible to reduce to 1/K the simultaneous change of the gradation value of the source signals S(1) to S(N), and thus to further lower a peak of EMI.

Figure 28:
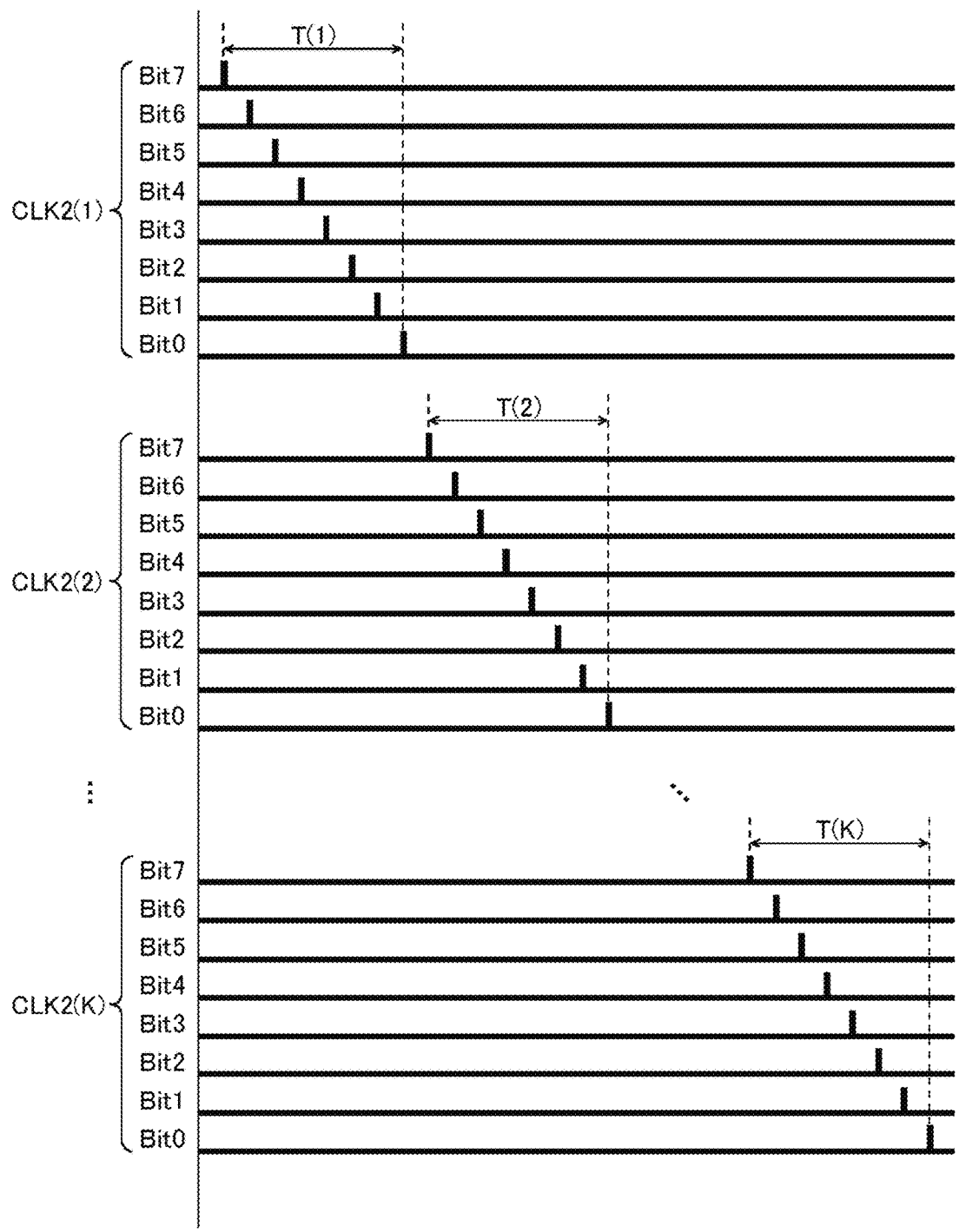
FIG. 28 is a diagram showing first time-division latch operation.
Figure 29:
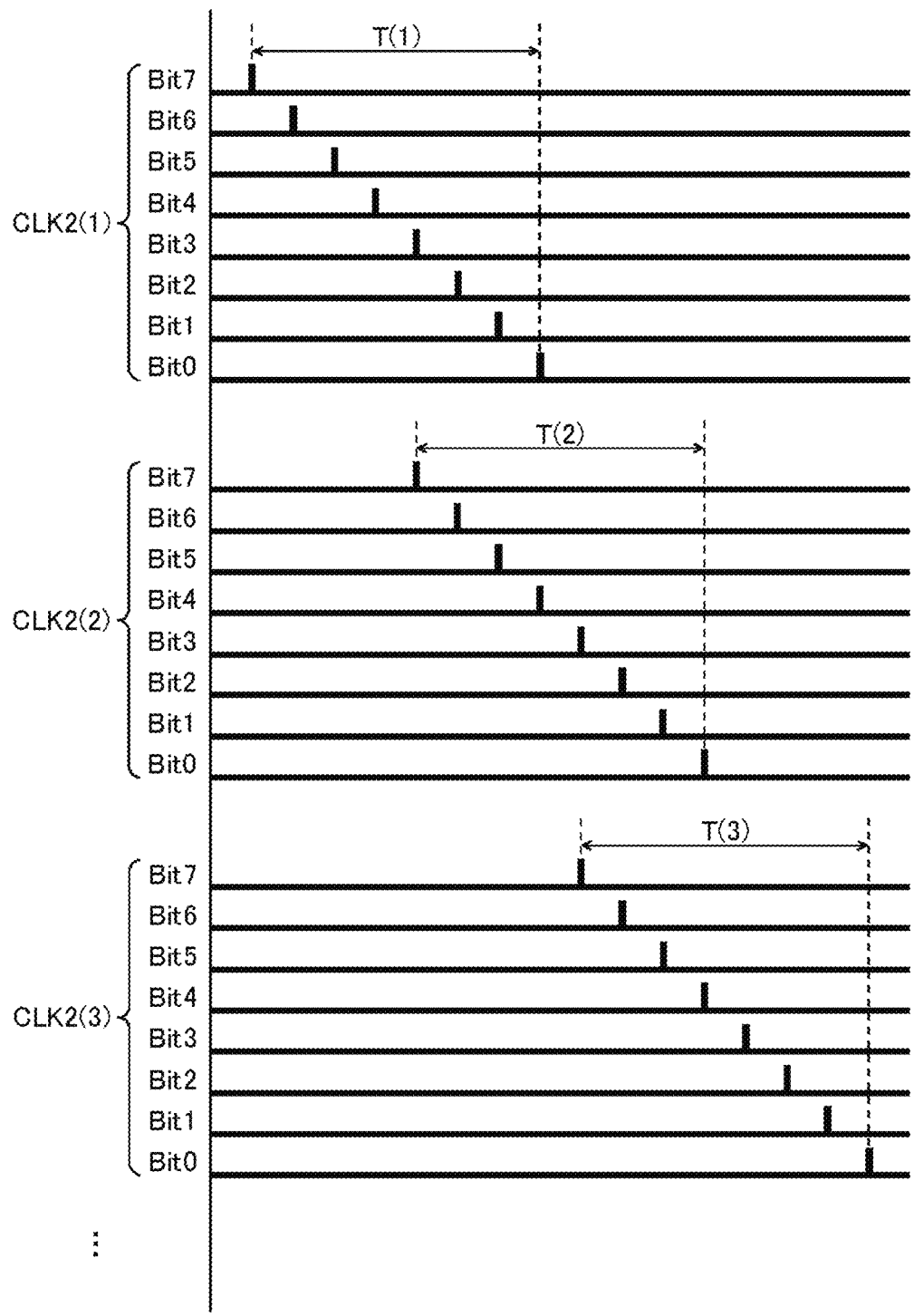
FIG. 29 is a diagram showing second time-division latch operation.

In a case where, in combination with time-division latch operation as described above, latch operation in units of one or more bits as thus far described (see the first to tenth practical examples) is used, the latch operation periods T (1) to T (K) of the respective groups may be separated from each other between temporally successive groups (see FIG. 28), or may partly overlap with each other between temporally successive groups (see FIG. 29).

Specifically, so long as the latch operation by the second latches 132(1) to 132(N) is completed within the period (horizontal blanking period) after all the image data within one horizontal period has been stored in the first latches 131(1) to 131(N) before the next horizontal period is started, there is no particular restriction on overlaps between, or the order of, the latch operation periods T (1) to T (K).

<Vehicle-Mounted Display>

Figure 30:
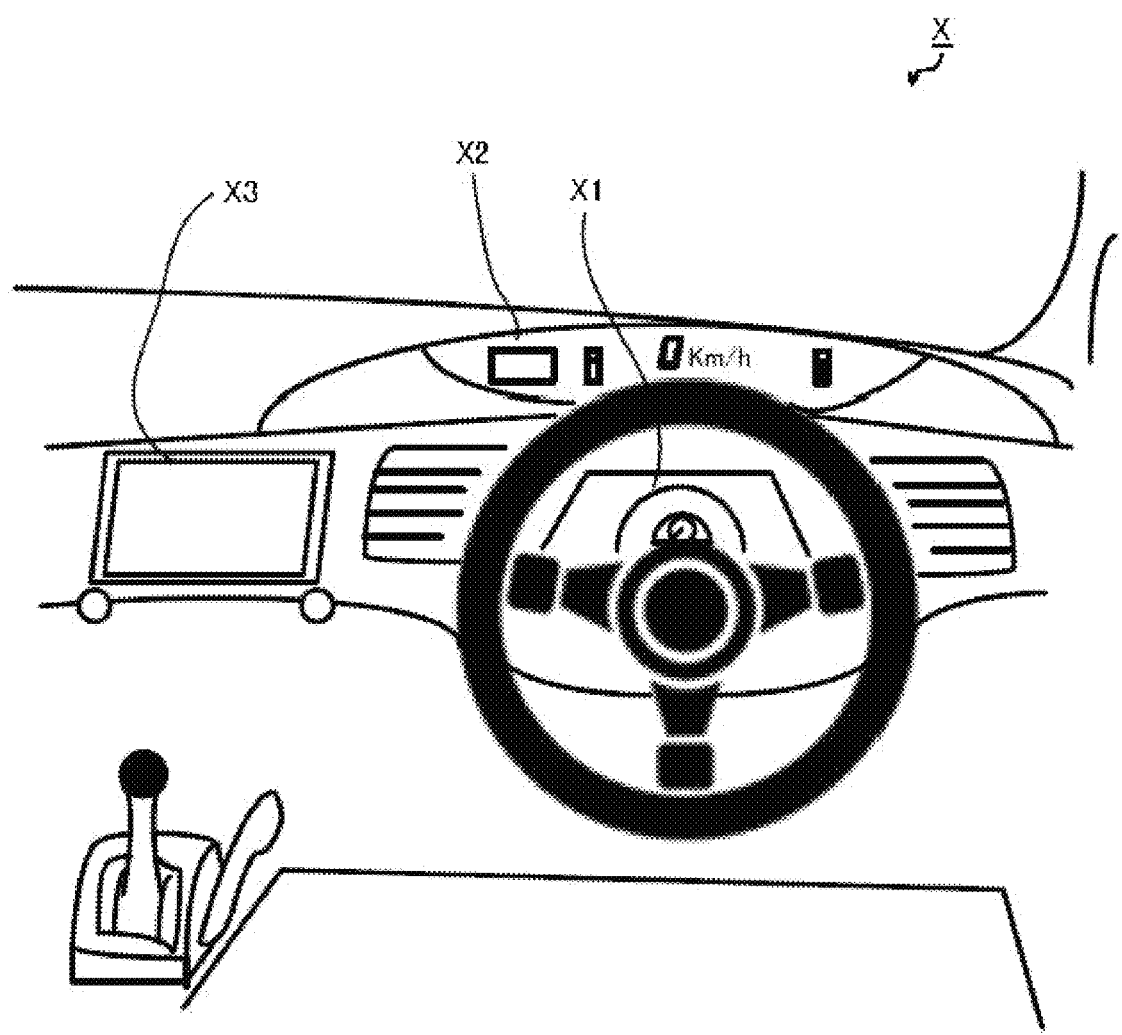
FIG. 30 is a diagram showing a configuration of a principal part of a vehicle provided with a vehicle-mounted display.

The display device 1 described above is suitable for use in vehicle-mounted displays in particular. A vehicle-mounted display is, like the vehicle-mounted displays X1 to X3 shown in FIG. 30, installed in the dashboard in front of the driver's seat in a vehicle X.

For example, the vehicle-mounted display X1 functions as an instrument panel (indicator panel built into a dashboard) that displays a speedometer, a tachometer, and the like. The vehicle-mounted display X2 displays a fuel gauge, a fuel economy meter, a shift position indicator, and the like. The vehicle-mounted display X3 provides a navigation function by displaying information on the current location of the vehicle, information on a route to a destination, and the like, and also provides a rear monitoring function by displaying a shot image of the view behind the vehicle.

As will be seen from the above, modern vehicles have come to be equipped with, in addition to a conventional car navigation system, applications such as an instrument panel that provides liquid crystal display over its entire area and a rear view monitor that displays an image of the view behind the vehicle, and the resolution involved is becoming increasingly high.

In this trend, the display device 1 described previously, with suppressed EMI emission, can minimize its effect on other vehicle-mounted equipment and contribute to safe traveling of vehicles.

Uses of the display device 1, however, are not limited to those mentioned above; it finds a variety of applications in general (in consumer equipment, vehicle-mounted equipment, industrial equipment, and the like).

<Other Modifications>

The various technical features disclosed herein may be implemented in any other manner than specifically described by way of embodiments above, and allow for many modifications within the scope of the technical ingenuity of the invention. That is, the embodiments described above should be considered to be in every aspect illustrative and not restrictive, and the technical scope of the present invention should be understood to be defined not by the description of embodiments given above but by the appended claims and to encompasses any modifications in the sense and scope equivalent to those of the claims.

INDUSTRIAL APPLICABILITY

The invention disclosed herein finds applications in, for example, driver ICs for vehicle-mounted displays.

LIST OF REFERENCE SIGNS 1 display device
100 panel driving device (driver IC)
110 interface
120 timing controller
130 source driver
131 first latch
132 second latch
133 DAC
134 amplifier
140 gate driver
150 command register
200 display panel
300 host controller
X vehicle
X1 to X3 vehicle-mounted display

The invention claimed is:

1. A source driver comprising:
a first latch that outputs a first data signal comprising x bits by latching an x-bit input data signal (where x≥2) in synchronism with a first clock signal;
a second latch that outputs a second data signal comprising x bits by latching the first data signal in a plurality of steps in units of one or more bits at every clock or at every plurality of clocks of the second clock signal;
a DAC that converts the second data signal into an analog signal of $2^x$ levels of gradation; and
an amplifier that receives the analog signal to output a source signal.

2. The source driver according to claim 1, wherein during at least part of a latch operation period, the second latch latches the first data signal one bit at every clock of the second clock signal.

3. The source driver according to claim 1, wherein during at least part of a latch operation period, the second latch latches the first data signal one bit at every plurality of clocks of the second clock signal.

4. The source driver according to claim 1, wherein during at least part of a latch operation period, the second latch latches the first data signal a plurality of bits at every clock of the second clock signal.

5. The source driver according to claim 4, wherein the second latch latches, of all the bits of the first data signal, lower bits in a larger number simultaneously.

6. The source driver according to claim 1, wherein during at least part of a latch operation period, the second latch latches the first data signal a plurality of bits at every plurality of clocks of the second clock signal.

7. The source driver according to claim 6, wherein the second latch latches, of all the bits of the first data signal, a highest and a lowest of unlatched bits simultaneously at every clock or at every plurality of clocks of the second clock signal.

8. The source driver according to claim 1, wherein the second latch latches the first data signal sequentially from a highest bit to a lowest bit or from the lowest bit to the highest bit at every clock or at every plurality of clocks of the second clock signal.

9. The source driver according to claim 1, wherein the second latch performs latch operation with different settings between adjacent columns.

10. The source driver according to claim 1, wherein the second latch switches settings for latch operation every predetermined period.

11. The source driver according to claim 1, wherein a plurality of the second latch for a plurality of columns start latch operation simultaneously for the plurality of columns.

12. The source driver according to claim 1, wherein a plurality of the second latch for a plurality of columns are divided into a plurality of groups, and start latch operation with timing shifted among the groups.

13. The source driver according to claim 12, wherein latch operation periods of the respective groups partly overlap with each other between temporally successive groups.

14. A panel driving device comprising:
an interface that receives image data and control commands;
a timing controller that performs timing control for individual blocks in the device;
the source driver according to claim 1 that outputs a source signal;
a gate driver that outputs a gate signal; and
a command register that stores the control commands.

15. A display device comprising:
the panel driving device according to claim 14;
a display panel that is driven by the panel driving device; and
a host controller that delivers image data and control commands to the panel driving device.

16. A vehicle comprising the display device according to claim 15.

* * * * *